United States Patent
Zhang et al.

(10) Patent No.: US 11,638,300 B2
(45) Date of Patent: Apr. 25, 2023

(54) CHANNEL ACCESS MECHANISM FOR RANDOM ACCESS CHANNEL IN UNLICENSED SPECTRUM

(71) Applicant: Huawei Technologies Co., Ltd., Shenzhen (CN)

(72) Inventors: Jiayin Zhang, Shanghai (CN); Mohamed Adel Salem, Kanata (CA); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/999,976

(22) Filed: Aug. 21, 2020

(65) Prior Publication Data
US 2020/0404708 A1     Dec. 24, 2020

Related U.S. Application Data

(63) Continuation of application No. PCT/CN2019/112401, filed on Oct. 22, 2019.
(Continued)

(51) Int. Cl.
| | |
|---|---|
| H04W 74/08 | (2009.01) |
| H04W 16/14 | (2009.01) |
| H04W 72/04 | (2009.01) |
| H04W 72/14 | (2009.01) |
| H04W 76/27 | (2018.01) |
| H04W 72/0446 | (2023.01) |
| H04W 72/0453 | (2023.01) |

(52) U.S. Cl.
CPC ....... *H04W 74/0808* (2013.01); *H04W 16/14* (2013.01); *H04W 72/0446* (2013.01); *H04W 72/0453* (2013.01); *H04W 72/14* (2013.01); *H04W 74/0833* (2013.01); *H04W 76/27* (2018.02)

(58) Field of Classification Search
CPC ......... H04W 74/0808; H04W 74/0833; H04W 76/27; H04W 16/14; H04W 72/0446; H04W 72/0453; H04W 72/14
USPC ....................................................... 370/329
See application file for complete search history.

(56) References Cited

U.S. PATENT DOCUMENTS

| | | |
|---|---|---|
| 2017/0251499 A1 | 8/2017 | Radulescu et al. |
| 2018/0249484 A1 | 8/2018 | Kim et al. |

(Continued)

FOREIGN PATENT DOCUMENTS

| | | |
|---|---|---|
| CN | 102595632 A | 7/2012 |
| CN | 105517184 A | 4/2016 |

(Continued)

OTHER PUBLICATIONS

Huawei, et al., "Coexistence and channel access for NR unlicensed band operations", 3GPP TSG RAN WG1 Ad-Hoc Meeting 1901, R1-1900060, Jan. 21-25, 2019, 17 Pages, Taipei.

(Continued)

*Primary Examiner* — Intekhaab A Siddiquee
(74) *Attorney, Agent, or Firm* — Slater Matsil, LLP

(57) ABSTRACT

Method and devices are provided for a channel access mechanism for accessing a network on a random access channel (RACH). Methods involve defining a listen-before-talk (LBT) category to be used as part of a contention based procedure and how a contention window that is part of the LBT can be dynamically adjusted.

18 Claims, 13 Drawing Sheets

Related U.S. Application Data

(60) Provisional application No. 62/751,460, filed on Oct. 26, 2018.

(56) References Cited

U.S. PATENT DOCUMENTS

| | | | |
|---|---|---|---|
| 2018/0288790 A1 | 10/2018 | Kim et al. | |
| 2019/0132882 A1* | 5/2019 | Li | H04L 27/2607 |
| 2019/0281636 A1* | 9/2019 | Liu | H04W 72/0446 |
| 2020/0037361 A1* | 1/2020 | Chakraborty | H04W 74/0833 |

FOREIGN PATENT DOCUMENTS

| | | | |
|---|---|---|---|
| CN | 107770877 A | 3/2018 | |
| CN | 108293268 A | 7/2018 | |
| CN | 108702698 A | 10/2018 | |
| CN | 108886815 A | 11/2018 | |
| JP | 2018520614 A | 7/2018 | |
| JP | 2018523333 A | 8/2018 | |
| JP | 2018528713 A | 9/2018 | |
| JP | 2018532306 A | 11/2018 | |
| WO | 2017039141 A1 | 3/2017 | |
| WO | WO-2017074254 A1 * | 5/2017 | ........ H04W 56/0045 |
| WO | WO-2017074638 A1 * | 5/2017 | ........ H04W 74/0808 |
| WO | 2017091693 A1 | 6/2017 | |
| WO | 2018011310 A1 | 1/2018 | |
| WO | 2018078101 A1 | 5/2018 | |
| WO | 2018088422 A1 | 5/2018 | |
| WO | 2018129725 A1 | 7/2018 | |

OTHER PUBLICATIONS

Oppo, "Enhancements of 4-steps RACH in NR-U", 3GPP TSG-RAN WG2 Meeting #103bis, R2-1813586, Oct. 8-12, 2018, 5 Pages, 2018 Chengdu, China.

Qualcomm Incorporated, "Report of Email Discussion [103#55] [NR-U] 2-step RACH Model and Initial Information Contents (Qualcomm)", 3GPP TSG-RAN WG2 Meeting #103bis, R2-1815564, Oct. 8-12, 2018, 18 Pages, Chengdu, China.

Huawei, et al., "Contention window size adjustment for UL category 4 LBT for eLAA", 3GPP TSG RAN WG1 Meeting #85, R1-164073, May 23-27, 2016, 4 Pages, Nanjing, China.

Lenovo, "Contention window size adjustment for LBT Category 4 for LAA PDSCH transmission", 3GPP TSG RAN WG1 Meeting #82bis, R1-155815, Oct. 5-9, 2015, 5 Pages, Malmo, Sweden.

Samsung, "Channel Access for autonomous UL access", 3GPP TSG RAN WG1 Meeting 91, R1-1720248, Nov. 27-Dec. 1, 2017, 6 Pages, Reno, USA.

* cited by examiner

CHANNEL ACCESS MECHANISM FOR RANDOM ACCESS CHANNEL IN UNLICENSED SPECTRUM

CROSS-REFERENCE TO RELATED APPLICATIONS

This application is a continuation of International Patent Application No. PCT/CN2019/112401, filed on Oct. 22, 2019, entitled "Channel Access Mechanism for Random Access Channel in Unlicensed Spectrum," which claims the benefit of priority of U.S. Provisional Patent Application No. 62/751,460, filed on Oct. 26, 2018, entitled "Channel Access Mechanism for Random Access Channel in Unlicensed Spectrum," which applications are hereby incorporated by reference in their entireties.

TECHNICAL FIELD

The present disclosure relates generally to wireless communications, and in particular embodiments, methods for accessing a random access channel in unlicensed spectrum.

BACKGROUND

In wireless communication systems, an electronic device (ED), such as a user equipment (UE), wirelessly communicates with a Transmission and Receive Point (TRP), termed "base station", to send data to the ED and/or receive data from the ED. A wireless communication from an ED to abase station is referred to as an uplink communication. A wireless communication from a base station to an ED is referred to as a downlink communication.

Resources are required to perform uplink and downlink communications. For example, an ED may wirelessly transmit data to a base station in an uplink transmission at a particular frequency and over a particular duration of time. The frequency and time duration used are examples of resources, and are sometimes called "time-frequency" resources. Other examples of resources or parameters for data transmission include modulation and coding scheme (MCS) used, reference signal such as demodulation reference signal (DMRS) for channel estimation, and transmit power ramping values used.

The wireless communication occurs over channels. A channel may be an uplink channel or a downlink channel. For example, a physical broadcast channel (PBCH) is a downlink channel used to transmit system information to EDs wanting to access the network. As another example, a physical uplink shared channel (PUSCH) is an uplink channel used to send data from the UEs to a base station. As another example, a physical downlink shared channel (PDSCH) is a downlink channel used to send data from a base station to EDs.

Sometimes during wireless communication a random access procedure needs to be performed. Example situations in which a random access procedure may be performed include: initial network access and connection establishment for a ED, e.g. registering with the network and acquiring uplink synchronization; re-synchronization when the ED and base station are out of synchronization, which may occur when the ED is in a connected state or in an inactive or idle state; connection re-establishment for connection failure; uplink or downlink data arrival when the uplink is in a non-synchronous condition; and/or handover procedure when timing synchronization is needed. When performing a random access procedure, a random access channel is used, e.g. a physical random access channel (PRACH).

The random access procedure often involves several steps. For example, a random access procedure may involve the following message exchanges: (1) the ED transmits a preamble on configured random access channel resources; (2) in response to receipt of the preamble, the base station transmits a random access response (RAR) message; (3) in response to receipt of the RAR message, the ED transmits an uplink transmission in an uplink data channel allocated by an uplink grant present in the RAR; and (4) in response to receipt of the uplink transmission from the ED in the uplink data channel, the base station transmits a reply, which may include a contention resolution message. These message exchanges can occur sequentially in the order described or possibly the ED could combine its messages and the base station could combine its messages.

In some implementations, the messages may be transmitted by the ED and/or the base station after a contention procedure, such as Listen-Before-Talk (LBT), to mitigate collision of the messages. When a contention procedure is used, there may be additional latency introduced in the random access process.

Aspects described above that are involved in the random access procedure may introduce an unacceptable level of latency and/or an unacceptable level of signaling overhead.

It is desired to improve the random access procedure to try to address latency and/or signaling overhead concerns.

SUMMARY

According to an aspect of the application, there is provided a method for wireless communications occurring in an unlicensed spectrum for accessing a network. The method involves an electronic device (ED) transmitting a first message in a random access channel (RACH) resource, the first message including a random access preamble. The method also involves the ED setting a contention window size (CWS) for a listen-before-talk (LBT) category 4 (CAT 4) contention procedure or type 1 UL channel access procedure for an uplink (UL) transmission subsequent to the first message, the UL transmission to be based on receipt of a second message to be received from a base station during a specified message reception time window.

In some embodiments, the method further involves the ED successfully receiving the second message from the base station during the specified message reception window, wherein the ED setting the CWS for the LBT CAT 4 contention procedure or type 1 UL channel access procedure comprises the ED setting the CWS for a subsequent UL transmission to a predefined minimum CWS value.

In some embodiments, setting the CWS for a subsequent UL transmission to a predefined minimum CWS value is applied to all channel access priority or the access priority corresponding to the first message.

In some embodiments, the first message also includes an indication for identifying the ED and the second message includes contention resolution information.

In some embodiments, the method further involves the ED not successfully receiving the second message from the base station during the specified message reception window, wherein the ED setting the CWS for the LBT CAT 4 contention procedure or type 1 UL channel access procedure comprises the ED setting the CWS for a subsequent UL transmission to a larger value than the CWS used in the LBT prior to the first message.

In some embodiments, the method further involves prior to successfully receiving the second message from the base station during the specified message reception window, the ED transmitting the UL transmission subsequent to a successful LBT CAT4 contention procedure; and the ED maintaining the CWS for a subsequent UL transmission at a value used in the LBT prior to the first message.

In some embodiments, the method further involves receiving the second message from the base station in the specified message reception window that includes a UL grant for the UL transmission and an indication that the ED is to use an LBT CAT4 contention procedure for a subsequent UL transmission; the ED setting a CWS for a LBT CAT 4 contention procedure for the UL transmission, which is a third message that includes an indication for identifying the ED, in response to information received in the second message; and the ED transmitting the third message.

In some embodiments, the method further involves receiving a fourth message that includes contention resolution information from a base station in response to the third message.

In some embodiments, the UL transmission is a retransmission of the first message, a grant based transmission on a physical uplink shared channel (PUSCH) or a configured grant transmission on the PUSCH or a physical uplink control channel (PUCCH).

In some embodiments, the method further involves prior to receiving the second message from the base station in the specified message reception window, the ED transmitting the UL transmission; and the ED maintaining the CWS for a subsequent UL transmission at a same CWS used in the LBT prior to the first message.

In some embodiments, the method further involves, when the received second message from a base station includes an indication that a type of LBT contention procedure to be used for a subsequent UL transmission is CAT4, the ED maintaining the CWS used for the first message for all channel access priority classes for the subsequent UL transmission.

According to an aspect of the application, there is provided a method for wireless communications occurring in an unlicensed spectrum for accessing a network. The method involves an electronic device (ED) transmitting a first message in a random access channel (RACH) resource, the first message including a random access preamble and using a category 4 (CAT4) contention procedure having a contention window size (CWS). The method also involves the ED receiving a message from a base station that includes an indication that a type of LBT contention procedure to be used for a subsequent uplink (UL) transmission is CAT4. The method further involves the ED maintaining the CWS used for the first or the subsequent UL transmission.

In some embodiments, upon receipt of the fourth message that notifies the ED of successful contention resolution, the ED setting the CWS for all channel access priority classes for a subsequent UL transmission to a predefined minimum CWS value.

In some embodiments, upon receipt of the fourth message that notifies the ED of a failed contention resolution, the ED setting the CWS for all channel access priority classes for a subsequent UL transmission to a larger value than used in the LBT prior to the third message.

In some embodiments, when a third message is retransmitted using a LBT CAT4 contention procedure or type 1 UL channel access procedure, the ED setting the CWS for the third message retransmission to a larger value than used in the LBT prior to the third message.

In some embodiments, when a predefined contention resolution timer expires, the ED setting the CWS and subsequent UL transmissions to a larger value than the current CWS.

In some embodiments, the CWS has a predefined number of values and a CWS value larger than the current CWS may be a next largest predefined CWS value, a CWS value having an index that is at least twice an index of the current CWS value, a CWS value having an index that is at least four times an index of the current CWS value, or a CWS value that is a predefined maximum CWS value.

An electronic device including at least one processor and at least one computer-readable memory having stored thereon computer executable instructions that when executed by the at least one processor, perform a method as described above.

According to an aspect of the application, there is provided a method for wireless communications occurring in an unlicensed spectrum. The method involves, in a four step procedure for accessing a random access channel (RACH) in which an electronic device (ED) transmits a first message including a random access preamble, is configured to receive a second message from a base station in response to the first message including an uplink (UL) grant, is configured to transmit a third message on a granted UL resource and is configured to receive a fourth message from the base station in response to the third message, the base station transmitting to the UE, in the second message, an indication of a type of LBT contention procedure that the UE is to use for the third message.

According to an aspect of the application, there is provided a method for wireless communications occurring in an unlicensed spectrum for random access. The method involves a base station receiving a first message in a random access channel (RACH) time-frequency resource from an electronic device (ED) that includes a random access preamble; the base station transmitting a second message in response to the first message that includes a grant of a transmission resource for an UL transmission; the base station configured to receive a third message from the ED; and when a percentage of third messages that have not been received is greater than or equal to a threshold, the base station setting a contention window size (CWS) for all channel access priority classes for a subsequent downlink (DL) transmission to a larger value than a CWS for the previous second messages.

According to an aspect of the application, there is provided a method for wireless communications occurring in an unlicensed spectrum The method involves, in a four-step procedure for accessing a network, a base station transmitting configuration information to an electronic device (ED), the configuration information including: 1) an indication of a time-frequency resource on a random access channel (RACH) at which the ED can transmit a preamble, the indication including a physical random access channel (PRACH) starting offset to transmit the PRACH preamble inside or outside of the base station acquired channel occupancy time (COT); 2) channel access type; and 3) channel access priority class.

In some embodiments, the method further involves the base station receiving a first message from the ED; the base station transmitting a second message to the ED that comprises one or more of: 1) an indication of a time-frequency resource allocation in the uplink data channel including one or more of: a physical uplink shared channel (PUSCH) starting position; a PUSCH ending symbol; and timing offset between the PUSCH and a specified message reception time window for a second message to be transmitted by the base station; 2) channel access type: 3) and channel access priority class.

According to an aspect of the application, there is provided a method for wireless communications occurring in an unlicensed spectrum. The method involves, in a two-step procedure for accessing a network, a base station transmitting configuration information to an electronic device (ED), the configuration information including one or more of: 1) an indication of a time-frequency resource on a random access channel (RACH) at which the ED may transmit a first message, the indication comprising a physical random access channel (PRACH) starting offset to transmit the PRACH preamble inside or outside of the base station acquired channel occupancy time (COT); 2) an indication of a time-frequency resource allocation in the uplink data channel including one or more of: a physical uplink shared channel (PUSCH) starting position; PUSCH ending symbol; and timing offset between PUSCH and a specified message reception time window for a second message to be transmitted by the base station; 3) channel access type: and 3) channel access priority class.

In some embodiments, the UL transmission is one of: a first message retransmission; a grant based transmission on a physical uplink shared channel (PUSCH); a configured grant transmission on the PUSCH; or a physical uplink control channel (PUCCH).

In some embodiments, the second message transmitted by the base station comprises an indication of a type of LBT contention procedure to be used for a third message to be transmitted by the ED.

In some embodiments, the method further involves the second message transmitted by the base station comprises an indication that a type of LBT contention procedure to be used for a third message to be transmitted by the ED is category 4 (CAT4).

In some embodiments, the method further involves the base station receiving a third message from the ED; and the base station transmitting a fourth message comprises an indication of contention resolution.

In some embodiments, the configuration information transmitted by the base station includes an indication that a type of LBT contention procedure to be used for a first message to be transmitted by the ED is category 4 (CAT4).

In some embodiments, the method further involves the base station transmitting an indication that a type of LBT contention procedure to be used for a first message to be transmitted by the ED is category 4 (CAT4) in a radio resource control (RRC) message.

According to an aspect of the application, there is provided a method for wireless communications occurring in an unlicensed spectrum. The method involves, in a four-step procedure for accessing a random access channel (RACH) in which a base station receives a first message, is configured to transmit a second message in response to the first message, is configured to receive a third message and is configured to transmit a fourth message in response to the third message, the base station transmitting the second message that includes an indication that a type of LBT contention procedure to be used for the third message is category 4 (CAT4).

A base station comprising at least one processor and at least one computer-readable memory having stored thereon computer executable instructions that when executed by the at least one processor, perform a method as described above.

BRIEF DESCRIPTION OF THE DRAWINGS

Embodiments of the present disclosure will be described in greater detail with reference to the accompanying drawings.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of this disclosure provide a channel access mechanism for accessing a network on a random access channel (RACH) that includes defining a listen-before-talk (LBT) category to be used as part of a contention based procedure and how a contention window that is part of the LBT can be dynamically adjusted.

Turning now to the figures, some specific example embodiments will be described.

Communication System

Figure 1:
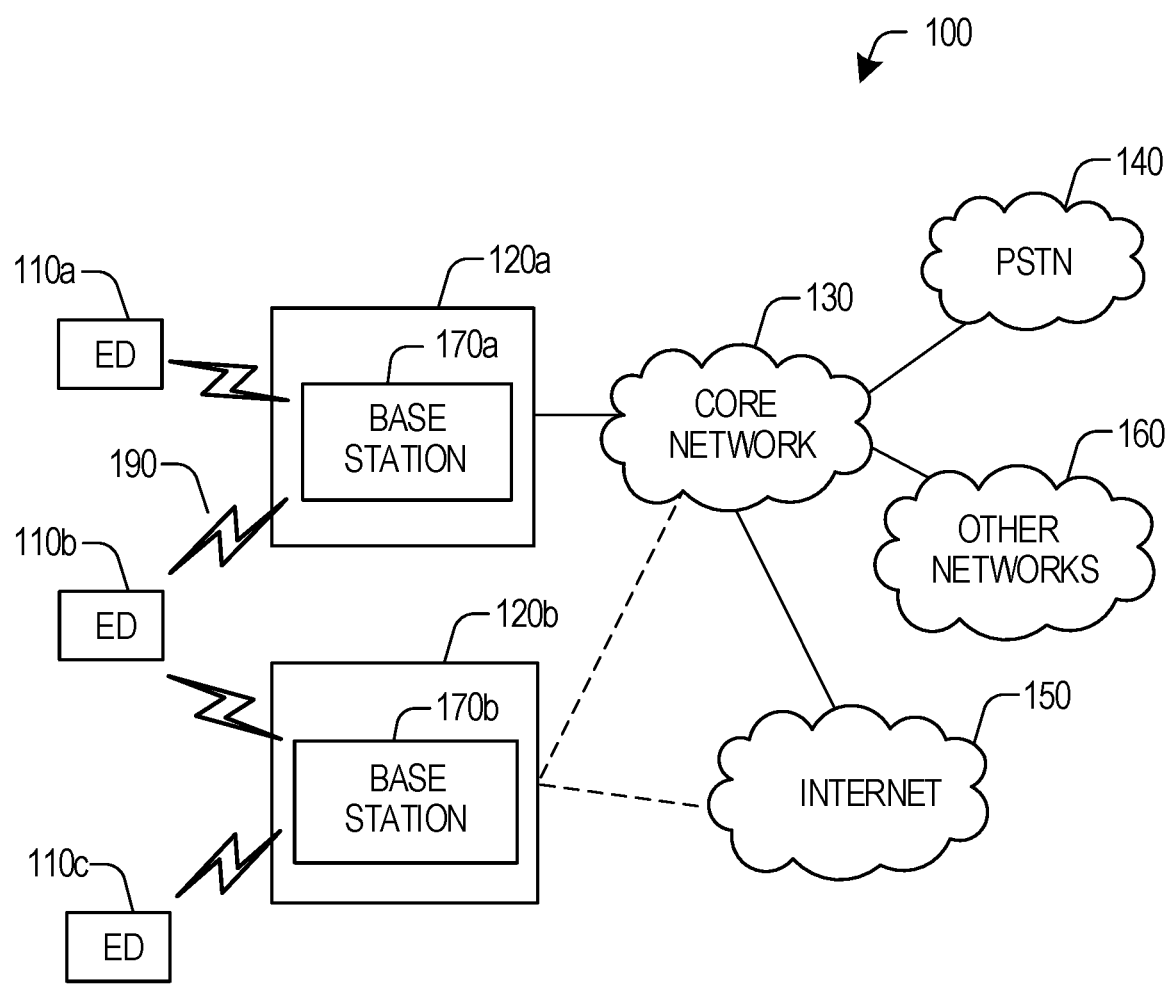
FIG. 1 is a schematic diagram of a communication system in which embodiments of the disclosure may occur.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110oa-110oc over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 X, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support such.

Figure 2A:
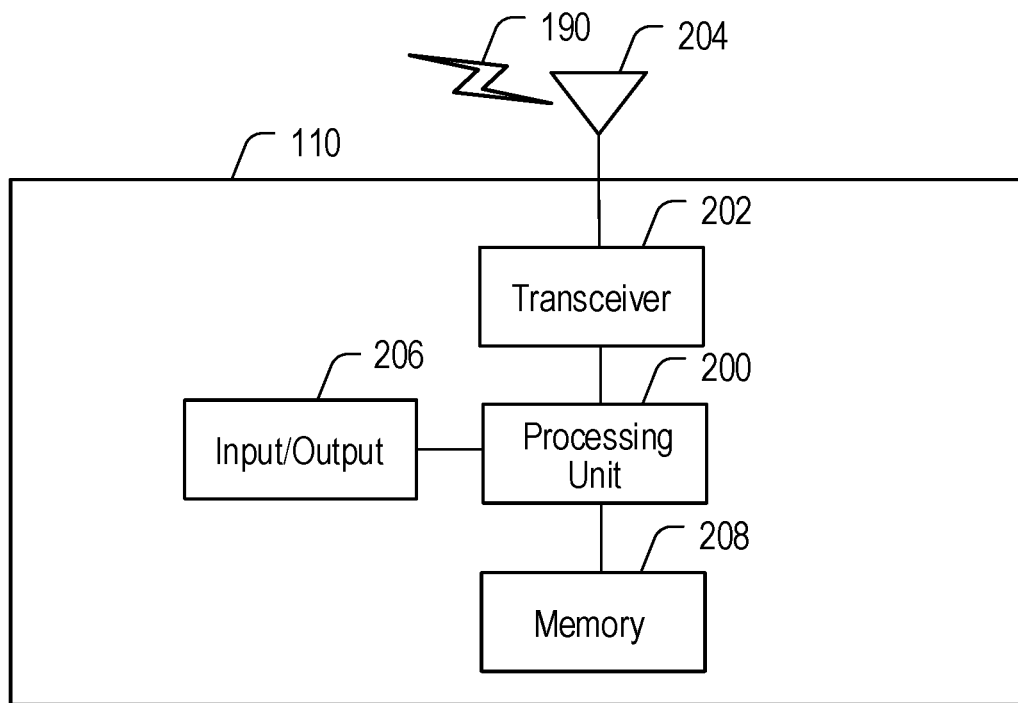
FIGS. 2A and 2B are block diagrams of an example ED and base station, respectively.
Figure 2B:
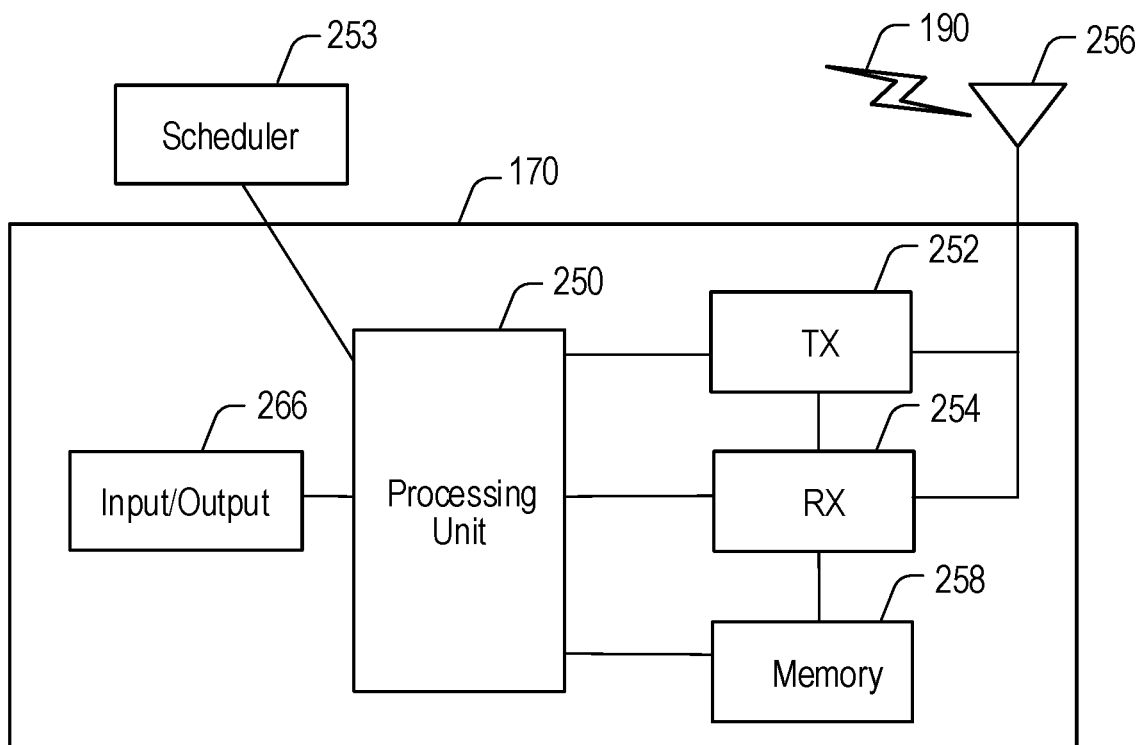

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NI) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 3:
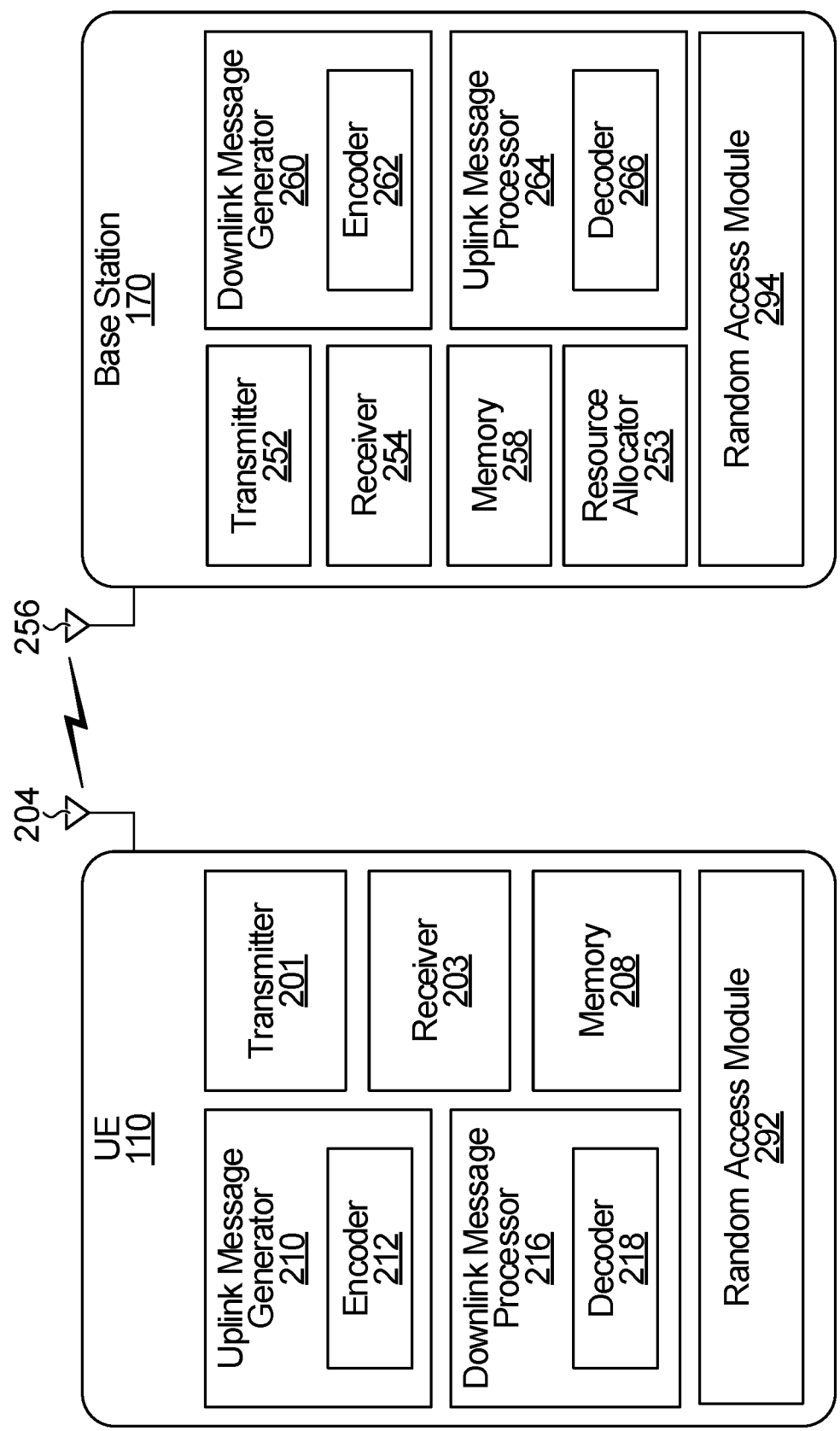
FIG. 3 is a block diagram of an example user equipment and base station.

FIG. 3 illustrates another example of an ED 110 and a base station 170. The ED 110 will hereafter be referred to as a user equipment UE) 110.

The base station 170 may be called other names in some implementations, such as a transmit and receive point (TRP), a base transceiver station, a radio base station, a network node, a transmit/receive node, a Node B, an evolved NodeB (eNodeB or eNB), a gNB, a relay station, or a remote radio head, or WiFi access point (AP). In some embodiments, the functions of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource grant/allocation, message generation, and encoding/decoding, and that are not necessarily part of the equipment housing the antennas of the base station 170. The modules may also be coupled to other base stations. In some embodiments, the base station 170 may actually be a plurality of base stations that are operating together to serve the UE 110, e.g. through coordinated multipoint transmissions.

The base station 170 includes a transmitter 252 and a receiver 254 coupled to one or more antennas 256. Only one antenna 256 is illustrated. The transmitter 252 and the receiver 254 may be integrated as a transceiver. The base station 170 further includes a downlink message generator 260 for generating a downlink transmission to be sent to the UE 110, e.g. for generating the downlink transmissions described herein. The downlink message generator 260 includes an encoder 262 for encoding the data to be sent in the downlink transmission. The downlink message generator 260 may be part of the transmitter 252. The base station 170 further includes an uplink message processor 264 for processing uplink transmissions received from the UE 110, e.g. for processing the uplink transmissions described herein. The uplink message processor 264 includes a decoder 267 for decoding uplink transmissions. The uplink message processor 264 may be part of the receiver 254. The base station 170 further includes a resource allocator 253, which may schedule the uplink resources granted to UE 110 for uplink transmissions, and which may also schedule downlink transmissions. For example, the resource allocator 253 may be used to schedule the resources granted for transmitting Msg 3 discussed later. The base station 170 further includes a random access module 294, which controls the base station 170 to perform the base station steps of the random access procedures described herein. For example, the random access module 294 may perform operations such as generating the random access channel configuration information, mapping random access channel preambles to uplink data channel resources, generating the timing advance and power adjustment parameters, processing the content of Msg 1 and Msg 3 described later, etc. The base station 170 further includes a memory 258 for storing information and data.

The downlink message generator 260, the encoder 262, the uplink message processor 264, the decoder 267, the resource allocator 253, the random access module 294, and/or any signal processing components of the transmitter 252 and receiver 254, may be implemented in the form of circuitry configured to perform the functions of the downlink message generator 260, the encoder 262, the uplink message processor 264, the decoder 267, the resource allocator 253, the random access module 294, and/or the transmitter 252 and receiver 254. In some implementations the circuitry includes memory 258 and one or more processors, such as processing unit 250 described earlier, that execute instructions that cause the one or more processors to perform the operations of the downlink message generator 260, the encoder 262, the uplink message processor 264, the decoder 267, the resource allocator 253, the random access module 294, and/or the transmitter 252 and receiver 254. Alternatively, the downlink message generator 260, the encoder 262, the uplink message processor 264, the decoder 267, the resource allocator 253, the random access module 294, and/or the transmitter 252 and receiver 254, may be implemented by a processing unit using dedicated integrated circuitry, such as an ASIC, a GPU, or an FPGA for performing the operations of the downlink message generator 260, the encoder 262, the uplink message processor 264, the decoder 267, the resource allocator 253, the random access module 294, and/or the transmitter 252 and receiver 254.

The UE 110 also includes a transmitter 201 and a receiver 203 coupled to one or more antennas 204. Only one antenna 204 is illustrated. The transmitter 201 and the receiver 203 may be integrated as a transceiver, e.g. transceiver 202. The UE 110 further includes a downlink message processor 216, including a decoder 218. The downlink message processor 216 and decoder 218 perform operations relating to processing received downlink messages, e.g. processing the downlink messages described herein. The downlink message processor 216 may be part of the receiver 203. The UE 110 further includes an uplink message generator 210, including an encoder 212. The uplink message generator 210 and encoder 212 perform operations relating to generating uplink transmissions, e.g. generating the uplink transmissions described herein. The uplink message generator 210 may be part of the transmitter 201. The UE 110 further includes a corresponding random access module 292, which controls the UE 110 to perform the UE steps of the random access procedures described herein. For example, the random access module 292 may perform operations such as receiving and accessing the association between the random access preambles and the uplink data channel resources, selecting an uplink data channel resource based on a selected random access preamble, processing the contents of Msg B described later, switching from a two-step random access procedure to a four-step random access procedure, etc. The UE 110 further includes a memory 208 for storing information and data.

The downlink message processor 216, the decoder 218, the uplink message generator 210, the encoder 212, the random access module 292, and/or any signal processing components of the transmitter 201 and receiver 203, may be implemented in the form of circuitry configured to perform the functions of the downlink message processor 216, the decoder 218, the uplink message generator 210, the encoder 212, the random access module 292, and/or the transmitter 201 and receiver 203. In some implementations the circuitry includes memory 208 and one or more processors, such as processing unit 200 described earlier, that execute instructions that cause the one or more processors to perform the operations of the downlink message processor 216, the decoder 218, the uplink message generator 210, the encoder 212, the random access module 292, and/or the transmitter 201 and receiver 203. Alternatively, the downlink message processor 216, the decoder 218, the uplink message generator 210, the encoder 212, the random access module 292, and/or the transmitter 201 and receiver 203, may be implemented by a processing unit using dedicated integrated circuitry, such as an ASIC, a GPU, or an FPGA for performing the operations of the downlink message processor 216, the decoder 218, the uplink message generator 210, the encoder 212, the random access module 292, and/or the transmitter 201 and receiver 203.

The base station 170 and the UE 110 may include other components, but these have been omitted for the sake of clarity.

The present application pertains in particular to channel access for a random access channel in unlicensed spectrum using listen-before-talk (LBT) mechanisms and defining contention window adjustment. Aspects of the present application may mitigate excess latency and may improve spectrum efficiency.

Unlicensed Spectrum Access

Given the scarcity and expense of bandwidth in the licensed spectrum, and the increasing demand for data transmission capacity, there is increasing interest in offloading at least some communication traffic, such as uplink communication traffic, to the unlicensed spectrum. For example, there has been significant interest in the unlicensed 5 GHz spectrum in which many Wireless Local Area Networks (WLANs) operate. Accordingly, in order to operate in this spectrum, efficient and fair coexistence with WLANs along with compliance with region-specific unlicensed spectrum regulations may be necessary.

Licensed-Assisted Access (LAA) and enhanced LAA (eLAA) of 3GPP Rel 13 and Rel 14, respectively, are aimed at porting the spectral-efficient mobile broadband (MBB) air interface (AI) to the vast and free-of-charge unlicensed spectrum through aggregating unlicensed component carriers (CCs) at the operator's small cells with the assistance of the anchor licensed carriers.

However, UL transmission in eLAA has been built around the grant based (GB) scheme only. To present a global unlicensed solution, regulatory requirements such as Listen-Before-Talk (LBT) have to be imposed on the medium access design. As such, UL transmission in eLAA has been disadvantaged in terms of latency and successful medium access opportunities due to the multiple contention levels for:

ED to transmit the scheduling request (SR) e.g., in stand-alone (SA) deployments, i.e., without an anchor licensed cell.

Base station to schedule the ED among other EDs.

Base station to transmit the scheduled grant (especially for self-carrier scheduling).

ED to pursue the GB transmission.

Aspects of the present disclosure address challenges of channel access in the unlicensed spectrum by enabling a channel access mechanism for random access channel as part of the unified NR-U air interface.

Before an ED can access unlicensed spectrum to transmit on an unlicensed spectrum sub-band, the ED performs a listen-before talk (LBT) operation (for example including initial clear channel assessment (ICCA) and an extended clear channel assessment (ECCA)) in order to check that the channel is idle before transmitting. A sub-band of an unlicensed spectrum band may include a group of frequency resources that comprises one or more unlicensed channels as defined by the IEEE 802.11 standard in the geographical region of operation, or one or more bandwidth parts (BWPs) as defined by wireless communication standards, for example.

In regions such as Europe and Japan, devices attempting to access the unlicensed spectrum have to comply with either a Load Based Equipment (LBE) LBT procedure or a Frame Based Equipment (FBE) LBT procedure.

In the LBE LBT procedure, a device attempting to access the unlicensed spectrum can start transmitting after a successful channel clear assessment (CCA). The CCA mechanism employed in such LBE LBT procedures may be the same CCA mechanism employed in WLAN, i.e. carrier sense multiple access with collision avoidance (CSMA/CA), or it may be based on an energy-detection-based CCA. For example, an energy-detection-based CCA may utilize a random back-off to determine the size of a contention window and a respective maximum channel occupancy time (MCOT) that determines the maximum amount of time that a device may transmit in the unlicensed spectrum once it has successfully contended for a transmission resource.

In FBE LBT procedures, a device attempting to access the unlicensed spectrum can start transmitting only at periodic instants after a short successful energy-detection-based CCA.

The 3rd Generation Partnership Project (3GPP) Release 13 Long Term Evolution (LTE) specification provides a framework for Licensed Assisted Access (LAA) in unlicensed spectrum. The framework includes a Category 4 (CAT4) LBT procedure (LBT with random back-off or ECCA) that each device attempting to access the unlicensed spectrum must comply with. Similar to the LBT mechanism in CSMA/CA for WIFI/WLAN, in the 3GPP Release 13 CAT4 LBT mechanism each device independently generates a random back-off counter or contention window (CW), and if a CCA is terminated due to a 'busy' assessment, the back-off counter is frozen to maintain priority in the next access attempt A first random access mechanism is a contention based mechanism. In the contention based mechanism, a single preamble sequence could potentially be used by more than one UE and thus the UEs content for the resource. A second random access mechanism is a non-contention based mechanism. In the non-contention based RACH mechanism, a dedicated preamble sequence is used by only a single UE. This may occur for example in a hand-over procedure.

Figure 4A:
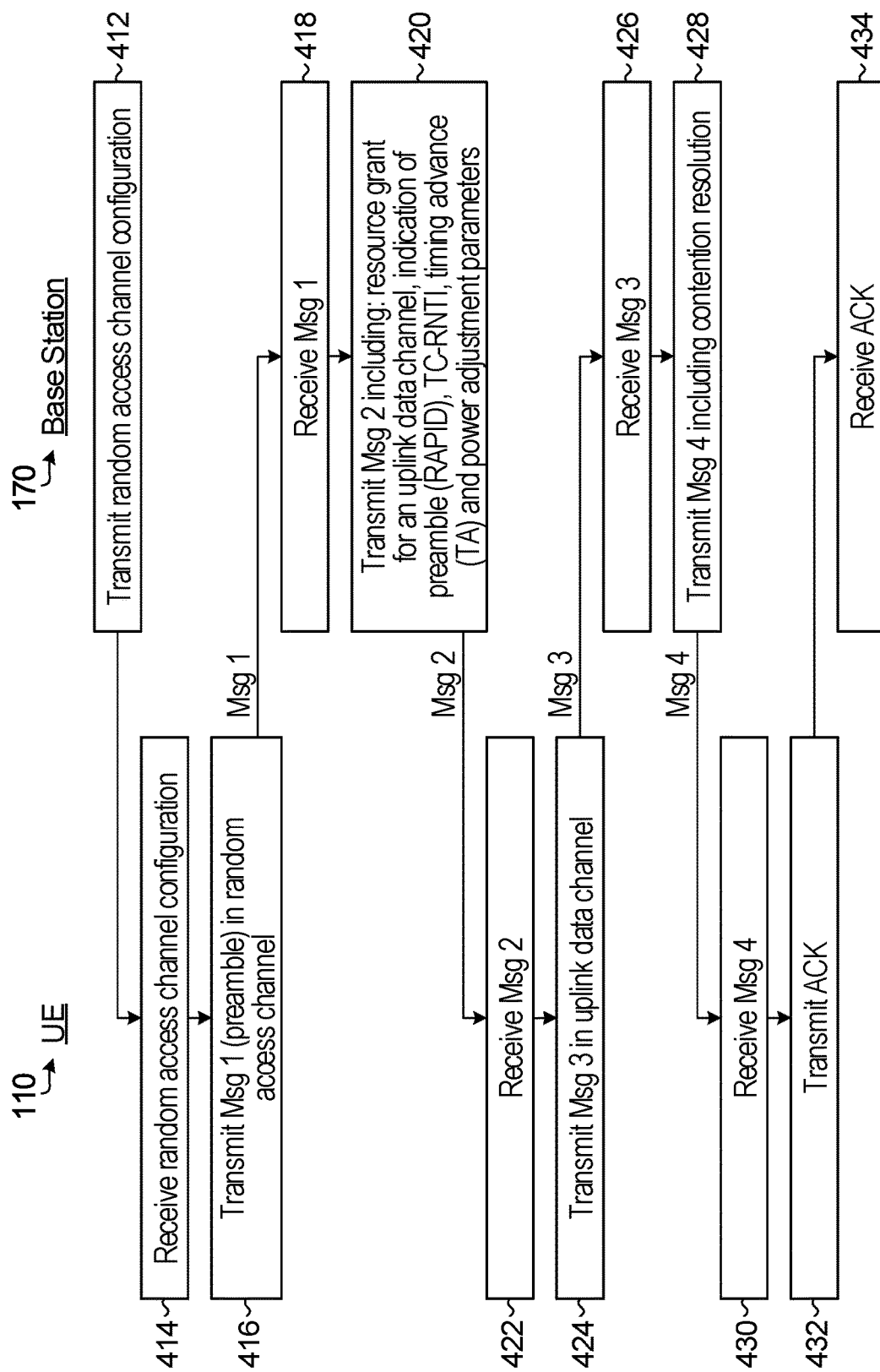
FIG. 4A is a flowchart illustrating steps of a contention-based four-step random access procedure, according to one embodiment.

FIG. 4A is a flowchart illustrating steps of an example contention-based random access procedure according to a four-step random access procedure. The four-step procedure involves the exchange of four messages Msg 1, Msg 2, Msg 3, and Msg 4, as described below. Msg 1 and Msg 3 are transmitted by the UE 110 to the base station 170, and Msg 2 and Msg 4 are transmitted as responses by the base station 170 to UE 110.

In step 412, the base station 170 transmits configuration information that configures the resources of a random access channel. The configuration information includes at least:

(1) An indication of a set of preambles that may be transmitted, by UEs, on the random access channel. The preambles may be referred to as random access preambles because they are for transmission on a random access channel as part of a random access procedure. Also, a preamble may sometimes be referred to as a preamble sequence. The set of preambles may be indicated by providing root sequence and cyclic shift information.

(2) An indication of the time-frequency resources on the random access channel at which UEs may transmit the preambles. In some embodiments, the time-frequency resources configuration may include a PRACH starting offset to transmit the PRACH preamble inside or outside of the base station acquired channel occupancy time (COT). The indication may include a random access channel index.

Other information may also be included in the configuration information, for example: the format of the preambles, e.g. short-format or long-format; subcarrier spacing for the uplink transmission on the random access channel; carrier frequency for the uplink transmission on the random access channel; precoding for Msg 3. In some embodiments, in particular pertaining to use of unlicensed spectrum, the configuration information may also include one or both of channel access type and channel access priority class.

The configuration information may be broadcast by base station 170, e.g. as part of a synchronization signal block (SSB)/physical broadcast channel (PBCH). The configuration information may be carried in system information, e.g. remaining system information (RMSI)/other system information (OSI). In alternative embodiments, depending on the scenario, the configuration information may instead be transmitted in higher-layer signaling, such as in radio resource control (RRC) signaling for a UE that is in an RRC connected state. In alternative embodiments, depending on the scenario, the configuration information may instead be transmitted in downlink control information (DCI).

In step 414, UE 110 receives the random access channel configuration information that was transmitted by the base station 170 in step 412. When the configuration information is broadcast by the base station 170, e.g. on a broadcast channel for initial network access, other UEs may also receive the configuration information.

The UE 110 randomly selects a preamble, e.g. preamble index i, from the set of usable preambles indicated in the configuration information received in step 414. In step 416, the UE 110 transmits the selected preamble on the random access channel to the base station 170. The transmitted message carrying the preamble is referred to as Msg 1. In step 418, Msg 1 is received by the base station 170.

The base station 170 detects the preamble transmitted by the UE 110, and in response the base station 170 transmits a response, which is sometimes called a random access response (RAR). The response is transmitted in step 420 on a downlink channel, e.g. on a downlink data channel, such as a PDSCH. The response is transmitted within a RAR time window, and the response corresponds to the preamble received in step 418. The response includes information referred to as Msg 2. Msg 2 includes two components:

Component 1: A resource grant for a transmission on an uplink data channel. The resource grant may instead be called a resource allocation. The words 'grant' and 'allocation' will be used interchangeably herein. The resource grant includes a plurality of transmission parameters, which are used by the UE 110 to transmit Msg 3 discussed below. The transmission parameters may include parameters such as: time-frequency resource allocation in the uplink data channel; resource index; frequency hopping flag; modulation and coding scheme (MCS) to be used for the uplink data transmission; transmission power control (TPC) for the uplink data transmission; channel state information (CSI); and demodulation reference signal (DMRS). In some embodiments, time-frequency resource allocation in the uplink data channel may include one or more of: PUSCH starting position; PUSCH ending symbol; and timing offset between PUSCH and RAR. In some embodiments, the Msg 2 may include one or both of channel access type and channel access priority class.

Component 2: Other information, some or all of which may be dependent upon Msg 1. Examples of the other information include:

(1) Random access preamble identifier (RAPID), i.e. an identity of the random access preamble that was sent in Msg 1. The UE 110 determines that Msg 2 is for UE 110 when the RAPID matches the preamble sent by UE 110 in Msg 1.

(2) The timing advance (TA) value to be used by UE 110 for uplink synchronization. The TA value is determined by the base station 170 based on the received transmission of Msg 1.

(3) One or more power adjustment parameters to be used by UE 110 for uplink transmissions. Power adjustment parameters are determined by the base station 170 based on the received transmission of Msg 1.

(4) A temporary identifier for the UE, e.g. a radio network temporary identifier (RNTI), such as a temporary cell RNTI (TC-RNTI).

In step 422, the UE 110 receives Msg 2. In step 424, the UE 110 sends an uplink data transmission in the uplink data channel using the resource grant present in Component 1 of Msg 2. The information sent in the uplink data transmission in step 424 includes information referred to as Msg 3. Msg 3 includes:

(1) Data to be sent from the UE 110 to the base station 170. The exact data sent is implementation specific and depends upon the reason for which the random access procedure is being performed. For example, for initial network access the data may include RRC connection request information. As another example, in some other scenarios the data may include RRC reconnection request information.

(2) A contention resolution identity, e.g. an identifier of UE 110 (UE ID) and/or a random value. The contention resolution identity is used for contention resolution in the manner described below.

The transmission of Msg 3 in the uplink data channel is performed by UE 110 using the TA and power adjustment indicated in Component 2 of Msg 2.

In step 426, the base station 170 receives Msg 3 in the uplink data channel. The data sent in Msg 3 is decoded. In step 428, the base station 170 transmits a response on a downlink channel, e.g. on a downlink data channel such as a PDSCH. The response carries information referred to as Msg 4. Msg 4 includes:

(1) Information from the base station 170 in response to the uplink data sent from UE 110 in Msg 3. For example, in the case of initial network access, Msg 4 may include connection confirmation information.

(2) The conflict resolution identity received in Msg 3. A conflict or collision occurs if in step 416 another UE also happened to have transmitted the same preamble as UE 110 in the same time-frequency resources of the random access channel. In an example, the base station 170 detects the preamble transmission of UE 110 and not the other UE's preamble transmission. Msg 2 is for UE 110, but the other UE incorrectly determines that Msg 2 is for the other UE because of a matching RAPID in Msg 2. The presence of the contention identity of UE 110 in Msg 4 indicates to the other UE that its random access procedure was not successful. UE 110 will detect a valid contention identity and thereby determine that UE 110's random access procedure was successful.

In step 430, UE 110 receives the downlink transmission of Msg 4 and concludes that Msg 4 is for UE 110 and that the random access procedure was successful because a valid contention resolution identity is decoded by UE 110. In step 432, UE 110 transmits an acknowledgement (ACK) to the base station 110 on an uplink channel, e.g. on an uplink control channel such as a physical uplink control channel (PUCCH). The ACK is received by the base station 170 at step 434.

In some embodiments, the UE 110 retransmits Msg 1 with the same or different preamble if the transmission of Msg 2 is not received, or if the contention resolution identity in Msg 4 invalid. In some embodiments, the base station 170 uses DCI to schedule UE 110 to retransmit Msg 3 when no valid Msg 3 is detected by the base station 110 on the granted uplink data channel resource.

The random access procedure described in relation to FIG. 4A is a contention-based random access procedure because the same preamble may possibly be used by different UEs on the same time-frequency resources of the random access channel.

A contention-free random access procedure may instead be performed using a variation of FIG. 4A in which a dedicated preamble is assigned to UE 110 and used by UE 110 in Msg 1. In a contention-free random access procedure, Msg 3 and Msg 4 may omit the contention resolution identity value. Contention-free random access is less applicable to initial network access and more applicable to situations in which the UE 110 is already in an RRC connected state and needs to perform the random access procedure for synchronization purposes, e.g. during a handover. Depending upon the implementation, the preamble specifically assigned to UE 110 may be transmitted in DCI or in higher layer signaling, e.g. in an RRC configuration message.

The four-step random access procedure described in relation to FIG. 4A may have an unacceptable level of latency and/or an unacceptable level of signaling overhead. The latency and/or signaling overhead may place a limit on certain applications, e.g. some new radio (NR) applications that require: fast network entry/initial access; and/or fast connection set-up; and/or fast state transitions; and/or fast uplink synchronization upon data arrival; and/or more effective data transmissions upon uplink out-of-synchronization.

Figure 4B:
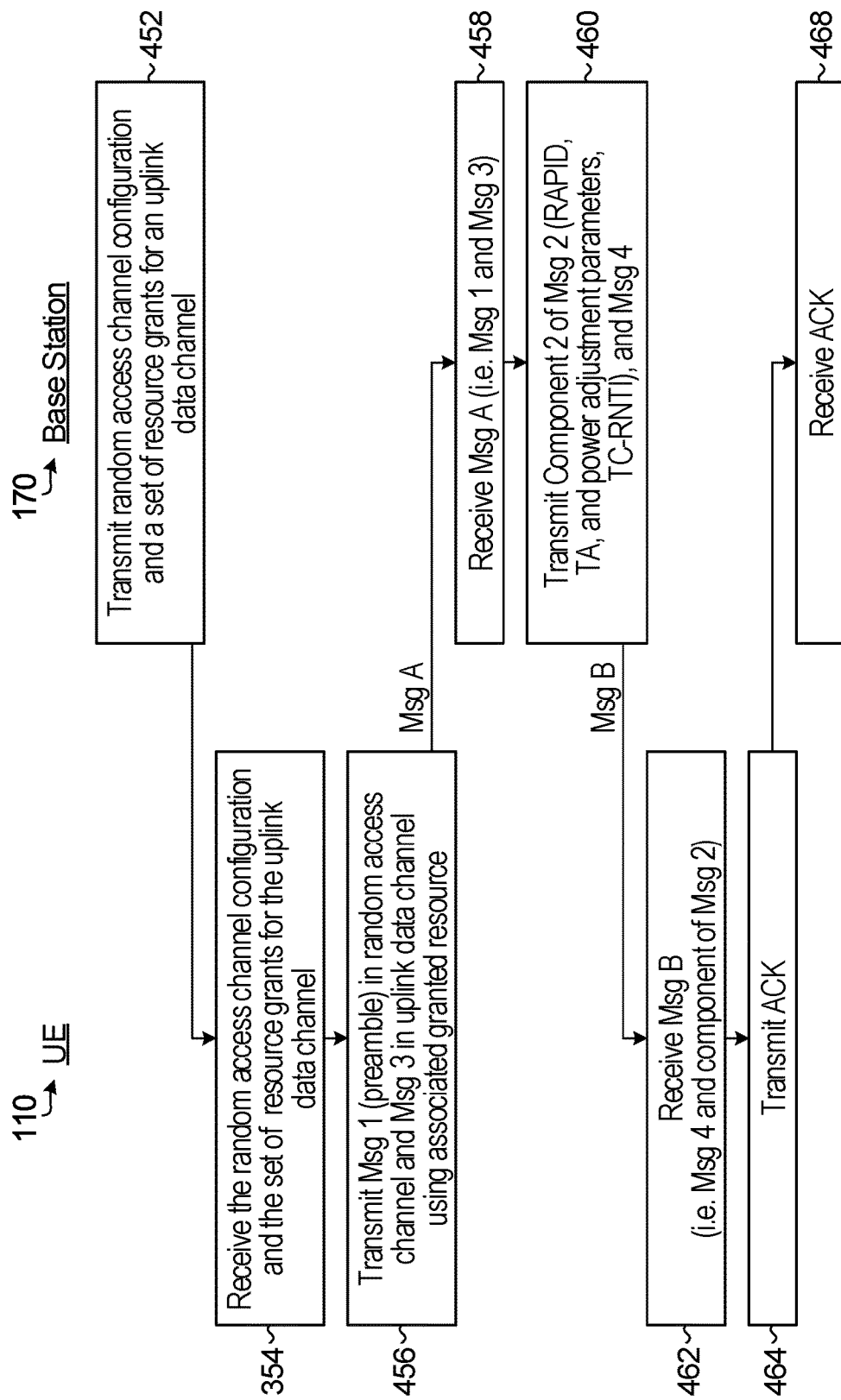
FIG. 4B is a flowchart illustrating steps of a contention-based two-step random access procedure, according to one embodiment.

Another RACH mechanism is a two-step procedure as opposed to the 4-step procedure described above. FIG. 4B is a flowchart illustrating steps of an example contention-based two-step random access procedure. The number of message exchanges is reduced compared to the four-step random access procedure described in relation to FIG. 4A, and so latency and/or signaling overhead may be reduced compared to the four-step random access procedure described in relation to FIG. 4A.

In step 452, the base station 170 transmits:
(1) Configuration information that configures the resources of a random access channel. This is the same configuration information as transmitted in step 412 of FIG. 4A. The configuration information includes at least an indication of a set of preambles that may be transmitted on the random access channel and an indication of the time-frequency resources on the random access channel at which the preambles may be transmitted, which may include a random access channel index. The other configuration information discussed above in relation to step 412 of FIG. 4A may also be included, for example: preamble format for short or long preamble sequences; subcarrier spacing; carrier frequency; precoding for Msg 3. In some embodiments, the time-frequency resources configuration may include a PRACH starting offset to transmit the PRACH preamble inside or outside of the base station acquired channel occupancy time (COT). In some embodiments, in particular pertaining to use of unlicensed spectrum, the configuration information may also include one or both of channel access type and channel access priority class. In some embodiments, the configured preambles and random access channels can support co-existence of (i) UEs with capability of four-step random access procedure (e.g. legacy UEs), and (ii) UEs with capability of two-step random access procedure or of both four-step and two-step random access procedures (or data transmissions).

(2) A set of resource grants for a set of uplink data channels. The set of uplink data channels may in some embodiments just be a single uplink data channel. Each resource grant includes a time-frequency resource allocation for, or defining, one of the set of uplink data channels for the Msg 3 transmission. Each resource grant also includes a respective plurality of other transmission parameters. The other transmission parameters for a resource grant may include parameters such as: frequency hopping flag; MCS to be used for the uplink data transmission; TPC for the uplink data transmission; CSI; and DMRS. In some embodiments, time-frequency resource allocation in the uplink data channel may include one or more of: PUSCH starting position; and PUSCH ending symbol. In some embodiments, the Msg 2 may include one or both of channel access type and channel access priority class. The transmission parameters for a resource grant are used to transmit Msg 3 in an uplink channel. The set of resource grants may be referred to as Msg 3 resource configuration. Moreover, the Msg 3 resource allocation (or the resource index for Msg 3) may have an association or mapping with preamble sequence(s) and/or random access channel(s). It is to be understood that the parameters described herein may not be a complete set of parameters. Furthermore, not all parameters would be included in each and every implementation. The parameters used may have particular pre-defined values for particular implementation scenarios.

In some embodiments, downlink transmission 452 may be broadcast by base station 170, e.g. as part of a SSB/PBCH, RMSI, OSI. In other embodiments, some or all of the information in downlink transmission 452 may be transmitted in higher-layer signaling, such as in RRC signaling, or in DCI. Examples are discussed later.

In step 454, UE 110 receives the information transmitted by the base station 170 in step 452. When the information is broadcast by the base station 170, e.g. on a broadcast channel for initial network access, other UEs may also receive the same information.

The UE 110 randomly selects a preamble from the set of usable preambles indicated in the information received in step 454. The UE 110 also selects an associated resource grant from the set of resource grants indicted in the information received in step 454. Examples of how the UE 110 decides which resource grant to select are discussed later.

In step 456, the UE 110 transmits Msg 1, which includes the selected preamble, on the random access channel to the base station 170. In step 456, the UE 110 also sends an uplink data transmission on the uplink data channel using the transmission parameters of the selected resource grant. The uplink transmission on the uplink data channel carries Msg 3, which includes:

(1) Data to be sent from the UE 110 to the base station 170. The exact data sent is implementation specific and depends upon the reason for which the random access procedure is being performed. For example, for initial network access the data may include RRC connection request information. As another example, in some other scenarios the data may include RRC reconnection request information.

(2) A contention resolution identity, e.g. an identifier of UE 110 (UE ID) and/or a random value. The contention resolution identity is used for contention resolution in the manner described herein.

There is no uplink TA or power adjustment information from the base station 170 for the UE 110 to use for transmission of Msg 3 in step 456 of FIG. 4B. The absence of the TA and power adjustment for transmitting Msg 3 is a possible drawback compared to the four-step random access procedure described in relation to FIG. 4A. However, the two-step random access procedure of FIG. 4B has the possible benefit of fewer message exchanges compared to the four-step random access procedure of FIG. 4A.

Msg 1 and Msg 3 transmitted in step 456 may sometimes be referred to collectively as Msg A, even though Msg 1 and Msg 3 are not transmitted as a single message, but are transmitted as two different messages on two different uplink channels, coupled together using time-division multiplexing (TDM), frequency-division multiplexing (FDM) or a combination of both.

In step 458, the base station 170 receives Msg 1 carrying the preamble in the random access channel, and the base station 170 also receives Msg 3 in the uplink data channel. The base station 170 knows the uplink resource of the uplink data channel on which to receive Msg 3 based on an association between the preamble and the resource grant, as explained later. Msg 1 is detected and decoded by the base station 170. The base station 170 can then obtain information including the UE uplink timing, Msg 3 transmission allocation, the UE transmission parameters, the UE identification, and/or channel estimation, etc. Then the uplink data of Msg 3 is decoded.

After detecting and correctly decoding both Msg 1 and Msg 3, in step 460 the base station 170 transmits a response on a downlink channel, e.g. on a downlink data channel such as a PDSCH. The response carries Msg B. Msg B includes:

(1) The rest of the information of Msg 2 that was not transmitted in step 452 and that is dependent upon Msg 1, e.g. Component 2 of Msg 2 described earlier, which includes: the RAPID sent by UE 110; the TA value corresponding to the RAPID; one or more power adjustment parameters corresponding to the RAPID used by UE 110.

(2) Msg 4, which includes: the information from the base station 170 in response to the uplink data sent from UE 110 in Msg 3, e.g. connection confirmation information; and the conflict resolution identity received in Msg 3.

In step 462, the UE 110 receives the downlink transmission of Msg B and concludes that Msg B is for UE 110 and that the random access procedure was successful because a valid contention resolution identity is decoded by UE 110. In step 464, UE 110 transmits an acknowledgement (ACK) to the base station 110 on an uplink channel, e.g. on an uplink control channel such as a PUCCH. The ACK is received by the base station in step 368. The ACK is not necessarily transmitted in all embodiments. However, if the ACK is transmitted then the ACK transmission uses the TA and power adjustment information provided to UE 110 in Msg B. Also, when the UE 110 performs a subsequent uplink data transmission, e.g. an uplink grant-free data transmission, the UE 110 uses the TA and power adjustment provided to UE 110 in Msg B. In some embodiments, the ACK is inherent by the presence of a subsequent uplink data transmission using the TA and power adjustment provided in Msg B.

In paragraphs that follow, reference is made to Msg A and Msg B in discussions of the two-step random access procedure and Msg 1, Msg 2, Msg 3 and Msg 4 in discussions of the four-step random access procedure. It is to be understood that use of these expressions when referring to these messages are intended to refer to the messages and their contents as described above with regard to FIGS. 4A and 4B.

The two-step random access procedure described in relation to FIG. 4B is a contention-based random access procedure. A two-step contention-free random access procedure may instead be performed using a variation of FIG. 4B in which a dedicated preamble is assigned to UE 110 and used by UE 110 in Msg 1. In a contention-free random access procedure, Msg 3 and Msg 4 may omit the contention resolution identity value.

For the two-step random access procedure or the four-step random access procedure, when Msg for Msg A is transmitted outside of a base station acquired channel occupancy time (COT), a LBT category 4 (CAT4) contention procedure may be used. The UE may choose the CAT4 parameters, such as the minimum contention window ($CW_{min}$) and the maximum contention window ($CW_{max}$) based on a highest priority. In some embodiments, the highest priority may correspond to a lowest channel access priority class index p. The UE can adjust the contention window size ($CW_p$) for transmissions subsequent to Msg 1 based on reception of Msg 2 or subsequent to Msg A based on reception of Msg B.

Contention for Two-Step Random Access Procedure in UL Transmissions

Several examples follow that are related to a two-step random access procedure. The examples describe how the contention window for a LBT contention process can be adjusted for uplink (UL) transmissions made by the UE using CAT4 LBT subsequent to a Msg A transmission based on whether a Msg B transmission from a base station is received by the UE.

Figure 5:
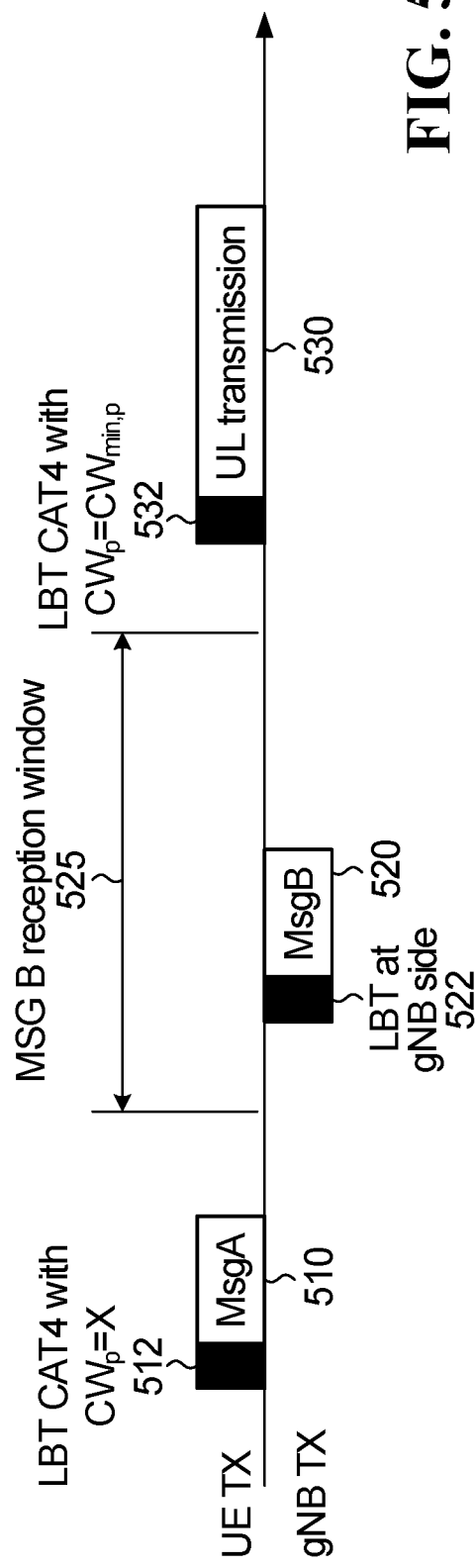
FIG. 5 is a signaling diagram of transmissions occurring between a user equipment and a base station for a two-step random access procedure according to a first embodiment.

In some embodiments of the two-step random access procedure, an example of which is described in FIG. 4B, the UE transmits the Msg A (step 456) after successfully performing the LBT CAT4 contention procedure. The LBT CAT4 contention procedure for the Msg A has a contention window size ($CW_p$). The value of $CW_p$ is within a pre-configured range. The pre-configured range may be defined by a minimum contention window ($CW_{min}$) and a maximum contention window ($CW_{max}$). The value of $CW_p$ is in terms of a predefined number of time slots $t_d$, e.g. $t_d=9$ μs in 5 GHz unlicensed band. The value of $CW_p$ may also be expressed in terms of a number of slots, a number of symbols or in a time duration, such as milliseconds. The UE will set a backoff counter for LBT CAT4 with a random integer value generated conforming to uniform distribution within the range from 0 to $CW_p$. Subsequent to the transmission of Msg A, the UE monitors the air interface for a period of time for the Msg B. The duration of the monitoring period may be configured before the RACH procedure begins. The base station may perform an LBT procedure before transmitting the Msg B (step 458) in order to avoid collisions. When the UE successfully receives the Msg B (step 462) transmitted by the base station in the Msg B reception window, the UE sets a contention window size ($CW_p$) for all channel access priority classes or corresponding channel access priority classes to Msg A to be a minimum contention window ($CW_{min}$) for a next UL transmission. FIG. 5 illustrates an example of such an embodiment.

Figure 6:
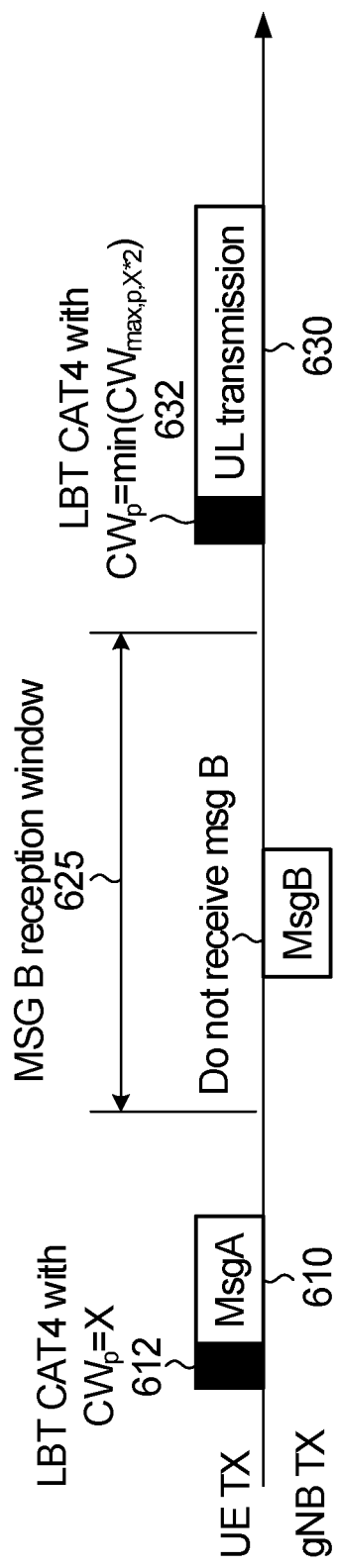
FIG. 6 is a signaling diagram of transmissions occurring between a user equipment and a base station for a two-step random access procedure according to a second embodiment.
Figure 7:
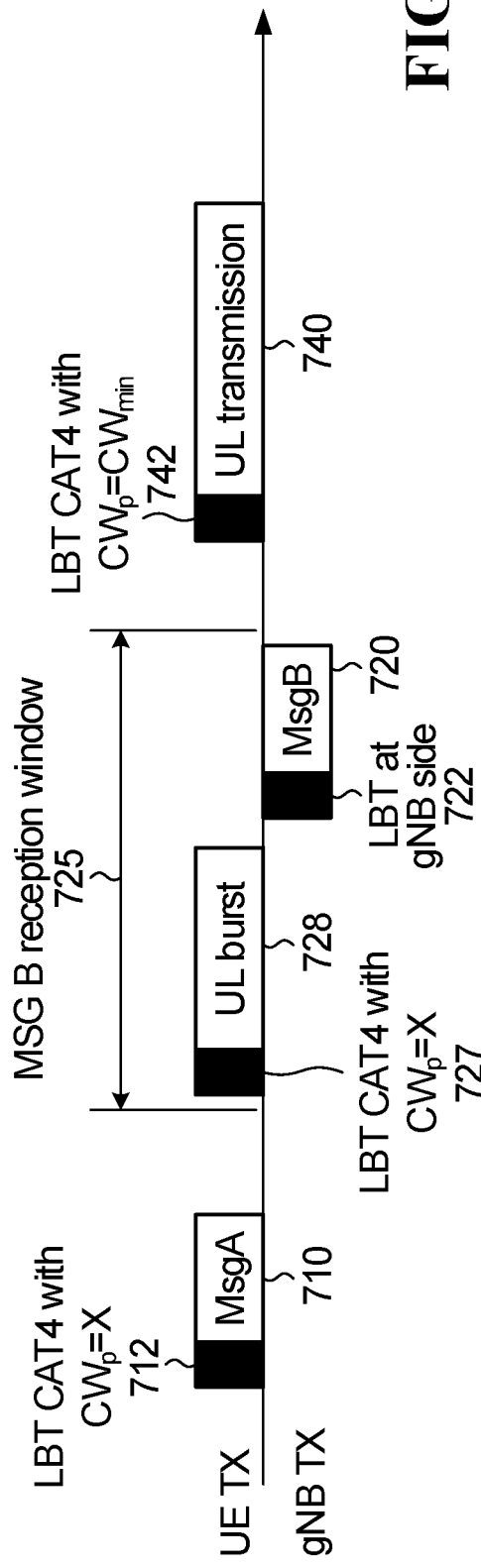
FIG. 7 is a signaling diagram of transmissions occurring between a user equipment and a base station for a two-step random access procedure according to a third embodiment.

FIGS. 5, 6 and 7 illustrate transmissions by a UE and base station (gNB) in which the transmissions made by the UE are shown above a horizontal line indicating a positive increasing time direction and the transmissions made by the base station are shown below the horizontal line. It should also be understood that although not shown in FIGS. 5, 6 and 7, there are additional messages transmitted and received prior to or after those messages illustrated. Examples may include the random access channel configuration messages, such as steps 452 and 454 in FIG. 4B and the ACK messages, such as step 464 and 468.

In FIG. 5, the UE is shown transmitting Msg A 510 (step 456) with a LBT CAT 4 procedure or type 1 UL channel access procedure 512 having $CW_p$ equal to X. A Msg B 520 is received (step 462) within a configured Msg B reception window 525. The Msg B is shown to have a LBT procedure 522 prior to the Msg B transmission. Because of the successful receipt of the Msg B 520 by the UE, the UE sets the contention window 532 for a next UL transmission 530 to $CW_{min}$.

In some embodiments, when the UE does not receive the Msg B within the configured Msg B reception window, the $CW_p$ for all channel access priority classes is increased to a next higher allowed value for subsequent UL burst transmissions. In some embodiments, the next higher allowed value for $CW_p$ is twice the value of the $CW_p$ used for the transmission of the Msg A. In some embodiments, when the next higher value allowed value for $CW_p$ is larger than a predefined $CW_{max}$ value for the CAT4 procedure, the next higher value may be set to the $CW_{max}$ value. FIG. 6 illustrates an example of such an embodiment.

For example, the $CW_p$ can be increased to the value as calculated by the following equation:

$$CW_p = \min(CW_{max,p}, 2X).$$

In FIG. 6, the UE is shown transmitting a Msg A 610 (step 456) with a LBT CAT 4 or type 1 UL channel access procedure 612 having $CW_p$ equal to X. No Msg B is received within the configured Msg B reception window 625 by the UE. The Msg B may or may not have been transmitted by the base station. For example, the base station may not have received the Msg A 610. Alternatively, the base station may have received the Msg A 610 and transmitted the Msg B, but the UE did not receive the Msg B due to some form of signal interference. Because of a lack of successful receipt of the Msg B by the UE, the UE sets the contention window $CW_p$ 632 for the next UL transmission 630 to a next higher allowed value.

In some embodiments, the UE transmits a UL transmission prior to determining whether the Msg A is successfully received by the base station, i.e. before the Msg B is received in the configured Msg B reception window. In such a scenario, the UE maintains the value of the contention window ($CW_p$) used for transmission of the Msg A for a subsequent UL transmission. FIG. 7 illustrates an example of such an embodiment.

In FIG. 7, the UE is shown transmitting Msg A no (step 454) after a LBT CAT 4 or type 1 UL channel access procedure 712 having $CW_p$ equal to X. The UE transmits a UL transmission 728 after a LBT CAT4 with contention window 727 early in the configured Msg B reception window 725. A Msg B 720 is received (step 462) within the configured Msg B reception window 725 by the UE, but after the UL transmission 728 by the UE. The Msg B is transmitted by the base station after a successful LBT procedure 722 at the base station. If the UE did not receive a positive acknowledgement (ACK) or a UL grant with NDI toggled for a HARQ process of UL transmission 728, the UE sets the contention window 742 for a next UL transmission 740 as $CW_{min}$. If the UE receives a negative acknowledgement (NAC) or uplink grant with NDI not toggled corresponding to the HARQ process of UL transmission 728, or there is no response from a base station when a predefined period of time has elapsed after UL transmission 728, the (which is not shown in FIG. 7) UE assumes that the contention window size 727 as $CW_{min}$ is insufficient and sets a contention window size 742 for a next UL transmission 740 at a higher level not exceeding $CW_{max}$, e.g. 2 times of $CW_{min}$.

In some embodiments, the UE resets the CWS to $CW_{min}$ regardless of whether Msg B is received by the UE or not.

Figure 16:
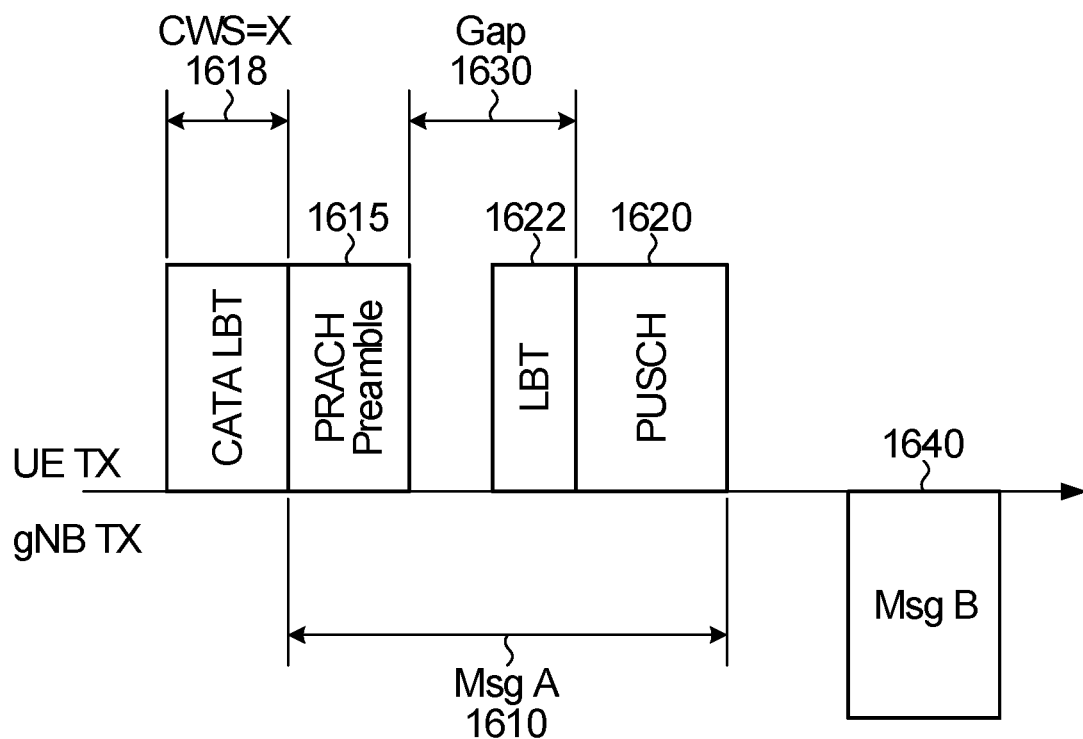
FIG. 16 is a signaling diagram of transmissions occurring between a user equipment and a base station in accordance with a twelfth embodiment of the present disclosure.

FIG. 16 illustrates transmissions by a UE and base station (gNB) in which transmissions made by the UE are shown above a horizontal line indicating a positive increasing time direction and the transmissions made by the base station are shown below the horizontal line. As described in step 456 of FIG. 4B, Msg A is comprised of a Msg 1 (a preamble in the RACH) and a Msg 3 (an uplink data channel, for example a physical uplink shared channel (PUSCH)). There may be a gap between the preamble and the transmission on the PUSCH.

FIG. 16 illustrates an example of a Msg A 1610 that includes a physical random access channel (PRACH) preamble 1615, a physical uplink shared channel (PUSCH) 1620 and a gap 1630 between the PRACH preamble 1615 and the PUSCH 1620. The Msg A 1610 is preceded by a CAT4 LBT 1618 with a CWS equal to X. An LBT 1622 is shown prior to the PUSCH 1620. The LBT 1622 may or may not be needed depending on the size of the gap 1630, as will be descried in further detail below. A Msg B 1640 is shown to be transmitted by the base station sometime after the Msg A 1610 in a similar manner as described in other example above.

In some embodiments, when the PRACH preamble 1615 and PUSCH 1620 in Msg A 1610 is transmitted in a time divisional multiplexed (TDM) manner with the gap 1630 being smaller than size Y, no LBT 1622 would be used prior to transmission on the PUSCH. When the gap 1630 is larger than size Y, but smaller than size Z, the LBT 1622 may be an LBT performed by the UE before transmitting on the PUSCH 1620. When the gap 1630 is larger than size Z, the LBT 1622 may be a CAT4 LBT with a highest channel access priority class. Non-limiting examples of sizes Y and Z may be 16 μs and 25 μs, respectively. The CWS of the LBT 1622 when it is a CAT4 LBT can be $CW_{min}$ or the CWS used to transmit preamble (X) can be maintained and used for the CAT4 LBT prior to the transmission on the PUSCH 1620.

Contention for Four-Step Random Access Procedure in UL Transmissions

Several examples follow that are related to a four-step random access procedure. The examples describe how the contention window for a LBT contention process can be adjusted for uplink (UL) transmissions made by the UE subsequent to a Msg 1 transmission based on whether a Msg 2 transmission from a base station is received by the UE.

In some embodiments of a four-step random access procedure, an example of which is described in FIG. 4A, after the UE has transmitted the Msg 1 (step 416) including the random access preamble, the UE does not receive the Msg 2 transmitted by the base station. The Msg 2 may be considered a random access response (RAR) and the preconfigured window for receiving the RAR may be considered a RAR reception window. The Msg 2 may or may not have been transmitted by the base station. For example, the base station may not have received the Msg 1. Alternatively, the base station may have received the Msg 1 and transmitted the Msg 2, but the UE did not receive the Msg 2 due to some form of signal interference. Also, the base station may have received the Msg 1, but the base station is unable to transmit the Msg 2 within the RAR reception window due to LBT failure. In such a scenario, the UE adjusts the contention window ($CW_p$) for a subsequent UL transmission with LBT CAT 4 or type 1 UL channel access procedure to a higher allowed value. The subsequent UL transmission may be any one of a Msg 1 retransmission, a grant based transmission on a physical uplink shared channel PUSCH or a grant free (also known as a configured grant) transmission on a PUSCH. This scenario would be similar to the example illustrated in FIG. 6, but the Msg A 510, Msg B 520 and Msg B reception window 725 in FIG. 5 would be replaced with Msg 1, Msg 2 and RAR window, respectively.

In some embodiments, the UE transmits a UL transmission, which includes an LBT CAT4 contention period, prior to the end of the RAR reception window. In such a scenario, the contention window $CW_p$ for a subsequent UL transmission is maintained at the same value used for transmitting the Msg 1. This scenario would be similar to the example illustrated in FIG. 7, but the Msg A no, Msg B 720 and Msg B reception window 725 in FIG. 7 would be replaced with Msg 1, and Msg 2 and RAR window, respectively.

In some embodiments of the four-step random access procedure, after the UE transmits a Msg 1 (step 416), the UE receives a Msg 2 (step 422) in the RAR reception window. The Msg 2 may include an indication that the UE is to transmit a Msg 3 using LBT CAT4 contention or type 1 UL channel access procedure. In some embodiments, the UE maintains the size of the contention window ($CW_p$) used for the Msg 1 contention for the Msg 3 contention. In some embodiments, the UE sets the size of the contention window ($CW_p$) used for subsequent UL transmissions to $CW_{min}$. Such embodiments may be used for contention free random access where only Msg 1 and Msg 2 are transmitted.

In some embodiments, the UE resets the CWS to $CW_{min}$ after the UE transmits the PRACH preamble (Msg 1) regardless of whether the RAR is received or not within the RAR reception window.

In some embodiments, subsequent to the UE transmitting the Msg 1 (step 416), receiving the Msg 2 (step 422) and transmitting the Msg 3 (step 424), the UE receives a Msg 4 (430) that indicates whether the contention resolution is successful for the UE. If the contention resolution is successful for the UE, the random access procedure as a whole is considered to be successful and the contention window ($CW_p$) for all channel access priority classes is set to a preconfigured minimum contention window ($CW_{min,p}$). An example of this is shown in FIG. 8

Figure 8:
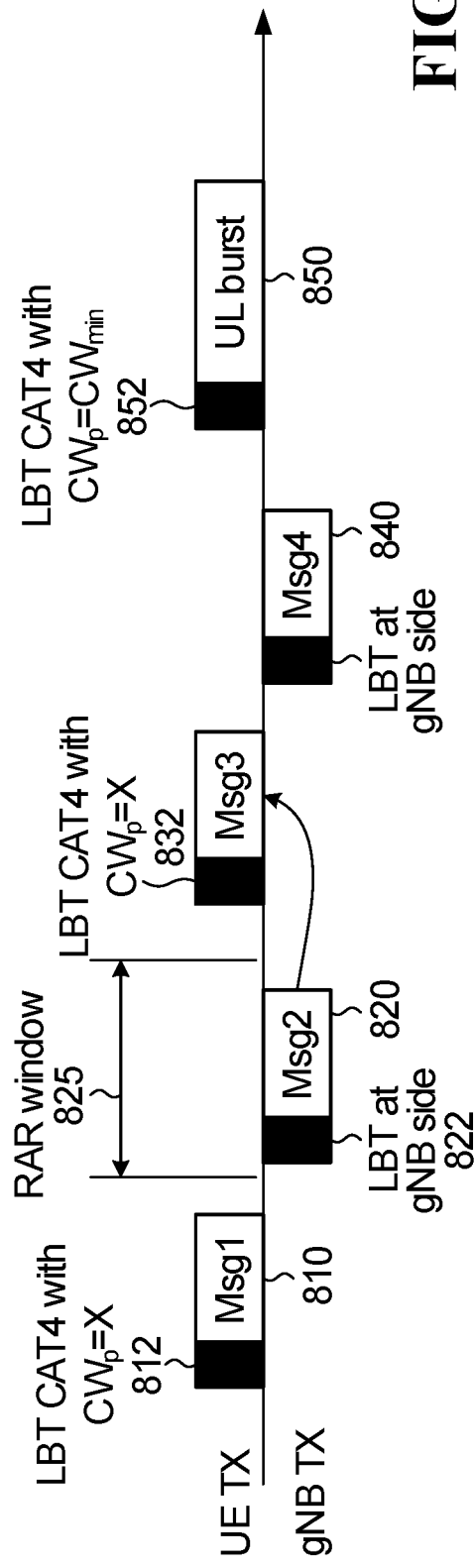
FIG. 8 is a signaling diagram of transmissions occurring between a user equipment and a base station for a four-step random access procedure according to a fourth embodiment.
Figure 9:
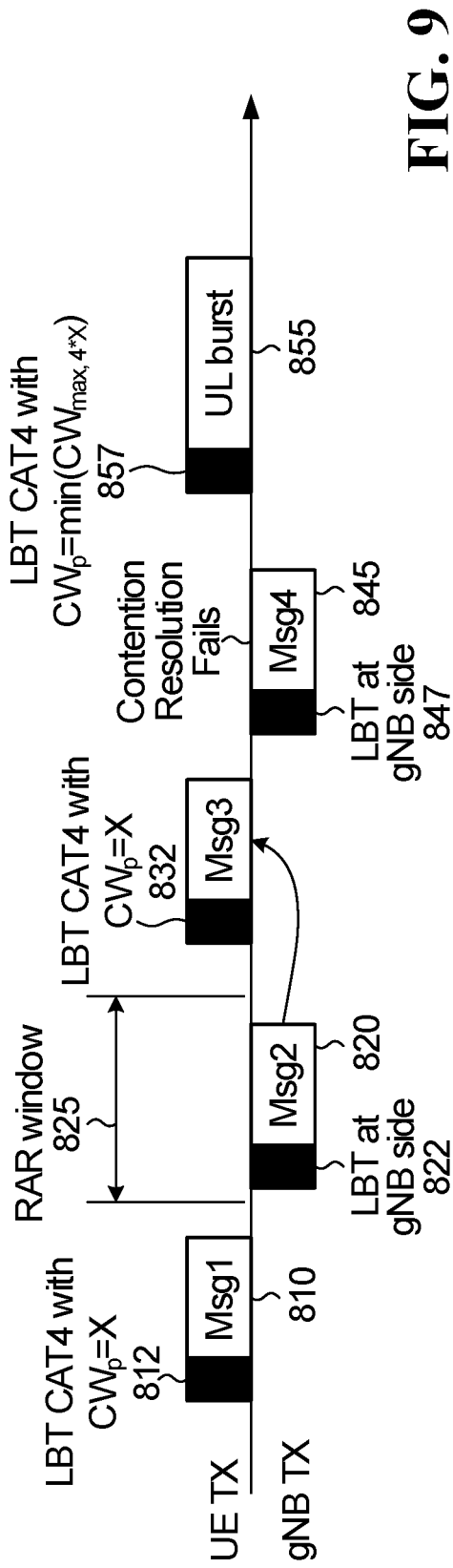
FIG. 9 is a signaling diagram of transmissions occurring between a user equipment and a base station for a four-step random access procedure according to a fifth embodiment.
Figure 10:
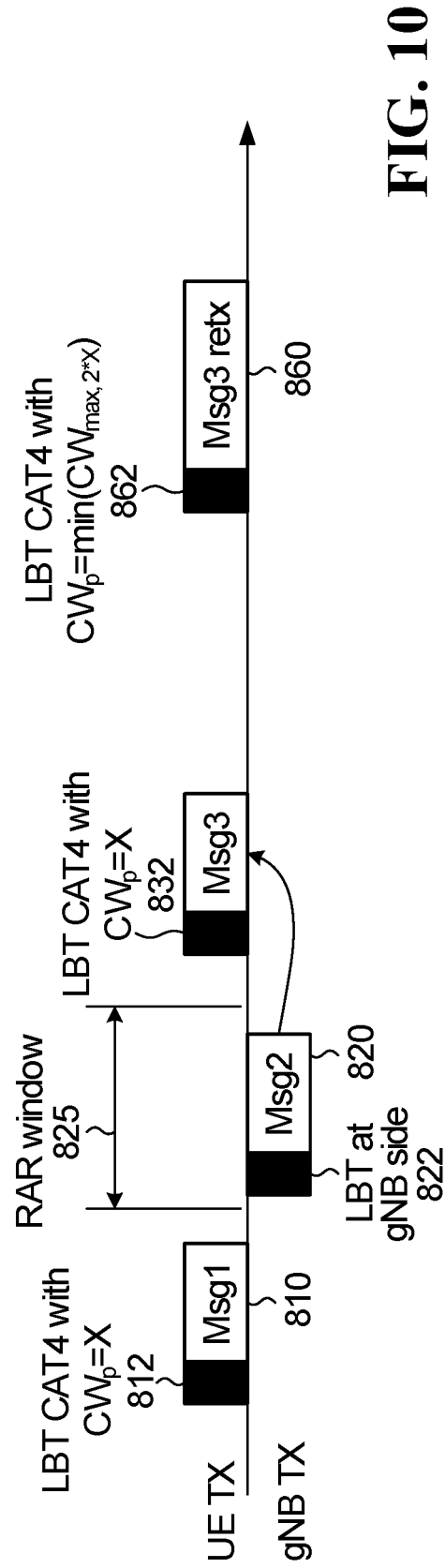
FIG. 10 is a signaling diagram of transmissions occurring between a user equipment and a base station for a four-step random access procedure according to a sixth embodiment.

FIGS. 8, 9 and 10 illustrate transmission by a UE and base station (gNB) in which the transmissions made by the UE are shown above a horizontal line indicating a positive increasing time direction and the transmissions made by the base station are shown below the horizontal line. It should also be understood that although not shown in FIGS. 8, 9 and 10, there are additional messages transmitted and received prior to or after those messages illustrated. Examples may include the random access channel configuration messages, such as steps 412 and 414 in FIG. 4A and the ACK messages, such as step 432 and 434.

In FIG. 8, the UE is shown transmitting a Msg 1 810 (step 416) with a LBT CAT 4 or type 1 UL channel access procedure 812 having $CW_p$ equal to X. A Msg 2 820 is received (step 422) within a configured RAR reception window 825. The Msg 2 is shown to have a LBT procedure with contention window 822 prior to the Msg B transmission. Msg 2 includes an indication that the Msg 3 to be transmitted by the UE should use LBT CAT4 contention prior to transmitting Msg 3. Because of the successful receipt of the Msg 2 820 by the UE, the UE sets the size of the contention window 832 for the Msg 3 830 equal to the value of X used for LBT CAT4 used prior to Msg 1. Subsequent to receiving Msg 3 830 (step 426), the base station performs a LBT contention 842 prior to transmitting a Msg 4 840. Msg 4 840 includes contention resolution information. Assuming that the contention resolution is successful for the UE, the UE can transmit a UL transmission 850. LBT CAT4 contention, having a contention window 852, is used for the UL transmission 850 for any channel access priority classes. Contention window 852 is set to a preconfigured minimum contention window size ($CW_{min,p}$). An example of such an embodiment is shown in FIG. 9.

In some embodiments, the UE receives the Msg 4, but fails contention resolution (e.g. the contention resolution identity in the Msg 4 does not match that held by the UE). In such a scenario, the $CW_p$ should be increased to a higher allowed value. In some embodiments, when the next higher value allowed value for $CW_p$ is larger than a predefined maximum contention window ($CW_{max}$) value set for the CAT4 procedure, the next higher value is set to the $CW_{max}$ value.

In some embodiments, a higher value for $CW_p$ is quadruple the value of the $CW_p$ used for the Msg 3, because failing the contention resolution in Msg 3 means that the UE has failed the contention resolution for Msg 1 as well.

FIG. 9 illustrates an example in which operations by the UE and the base station are similar to those shown in FIG. 8, up until completion of the transmission of Msg 3 830 by the UE. However, in the example of FIG. 9, the contention resolution transmitted by the base station in Msg 4 845, subsequent to the LBT contention period 847, indicates that contention resolution is unsuccessful for the UE. The UE can still transmit a UL transmission 855 subsequent to a LBT CAT4 contention having a contention window 857, but the contention window 857 is increased in the example to the lesser of quadruple the contention window used in transmitting in Msg 3 or a pre-configured maximum contention window ($CW_{max}$).

In some embodiments, a contention resolution timer is used to define an expiry of a waiting period for a Msg 4 to be received. If no Msg 4 is received before the contention resolution timer expires, the contention resolution is considered to fail for the UE. In such a scenario, the $CW_p$ is increased to a higher allowed value. If the higher value allowed value for $CW_p$ is larger than a predefined maximum contention window ($CW_{max}$) value set for the CAT4 procedure, the next higher value may be set to the $CW_{max}$ value.

In some embodiments, the UE may be scheduled to retransmit the Msg 3. This may occur because the base station did not receive Msg 3 on the resource allocated in Msg 2. The size of the contention window ($CW_p$) of the LBT CAT4 contention used prior to the Msg 3 retransmission may be increased to a next higher allowed value. If the next higher value allowed value for $CW_p$ is larger than a predefined maximum contention window ($CW_{max}$) value set for the CAT4 procedure, the next higher value may be set to the $CW_{max}$ value. An example of such an embodiment is shown in FIG. 10.

FIG. 10 illustrates an example in which operations by the UE and the base station are similar to those shown in FIG. 8, up until completion of the transmission of Msg 3 830 by the UE. However, in the example of FIG. 10, the base station does not receive the Msg 3 and schedules the UE to retransmit Msg 3. The LBT CAT4 contention window 862 of the Msg 3 retransmission 860 is increased in the example to the lesser of twice the contention window 832 used in transmitting Msg 3 830 or a pre-configured maximum contention window ($CW_{max}$).

The contention window is indicated as being increased by two times in some of the embodiments described above. In some embodiments, initial $CW_p$ values may be practically implemented as an odd integer number of time slots, such as {15, 31, 63, 127, ...}. In some embodiments, a single time slot $t_d$ is equal to 9 μs for 5 Ghz. Therefore, when $CW_p$ is equal to an odd integer value, and the contention window is described in examples above to be increased to a value of 2X, the contention window may actually be increased to 2X+1 rather than 2X. For examples that are described above where the contention window size is increased by four times, the contention window is actually increased to a value equal to 4X+1.

Contention for Four-Step Random Access Procedure in DL Transmission of Msg 2

An embodiment follows that is related to a four-step random access procedure. The embodiment describes how the contention window for a LBT contention process can be adjusted for downlink (DL) transmission subsequent to Msg 2 transmissions made by the base station based on how previous Msg 2 transmissions are acknowledged by the UE.

In some embodiments, the base station transmits a Msg 2 transmission in the physical downlink shared channel (PDSCH) as part of DL transmission burst on an unlicensed carrier, after first sensing the channel to be idle during a configured duration. If the base station transmits a DL transmission burst that is associated with channel access priority class p, the base station may set an initial contention window value $CW_p$ and adjust the $CW_p$ in future DL transmissions appropriately based on acknowledgements received from the UE corresponding to PDSCH in the reference resource (subframe/slot/symbols) in the previous DL transmission burst. The PDSCH carrying Msg 2 might be in the reference resource. For example, the initial contention window ($CW_p$) for every priority class $p \in \{1,2,3,4\}$ may be set $CW_p = CW_{min,p}$. If at least Z=80% of acknowledgement (ACK) values corresponding to PDSCH transmission(s) in reference subframe k are determined to be a negative acknowledgment (NACK), then the $CW_p$ is increased, for every priority class $p \in \{1,2,3,4\}$, to a next higher allowed value. The value of 80% indicated above is by way of example and not intended to limit the threshold of Z.

Reference subframe k is the starting subframe of the most recent transmission made by the base station, for which at least some ACK/NACK feedback is expected to be available.

In some embodiments, a physical downlink shared channel (PDSCH) carrying the Msg 2 in the four-step random access procedure is included in a reference slot or subframe. Before the current DL transmission burst, at least one physical uplink shared channel (PUSCH) carrying the Msg 3 from a UE is received by the base station. In such a scenario, the PDSCH carrying the Msg 2 in the reference slot/subframe can be regarded as a positive acknowledgement (ACK) when determining the parameter Z identified above that is used in contention window adjustment for subsequent Msg 2 transmissions.

In some embodiments, if the PUSCH resource for Msg 3 is before the current DL transmission burst and there is no valid Msg 3 received by the base station, the PDSCH carrying Msg 2 is regarded as a negative acknowledgement (NACK). In some embodiments, the PDSCH carrying the Msg 2 is excluded from the contention window adjustment procedure or the base station should avoid scheduling Msg 2 in the reference slot for the following DL transmission burst.

Figure 11:
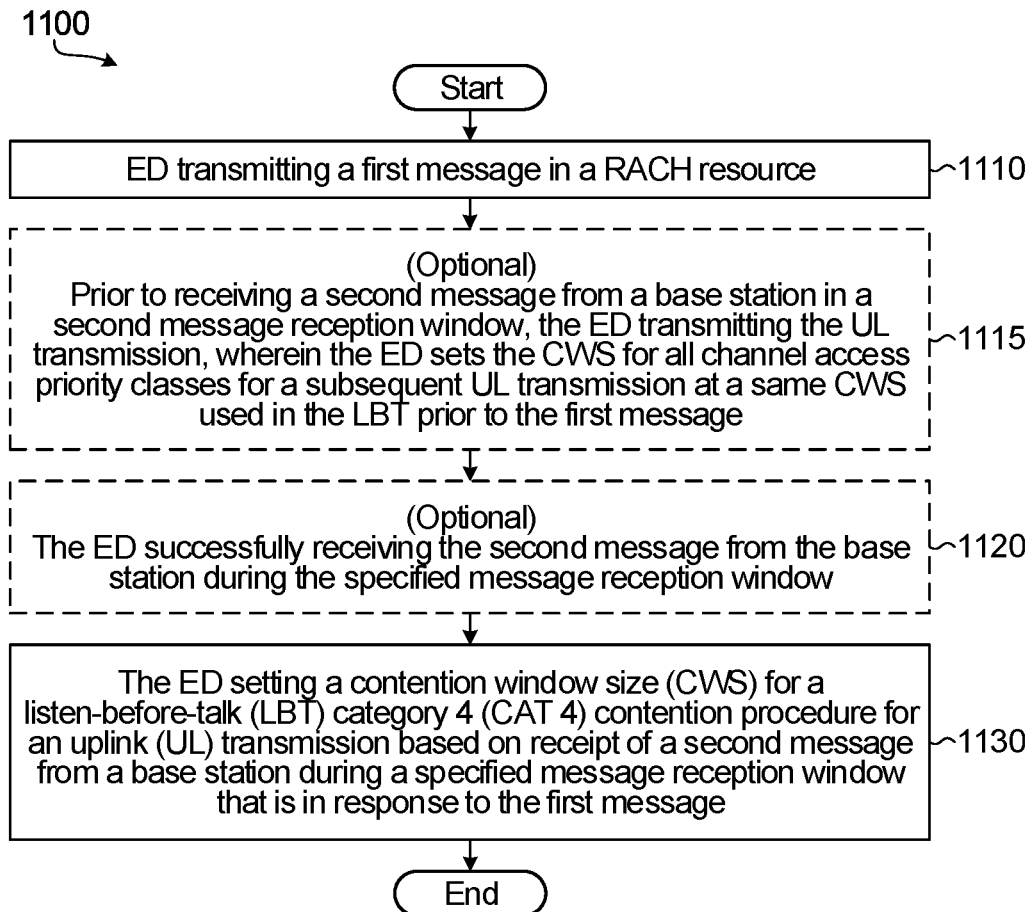
FIG. 11 is a flow diagram of example operations in an ED in accordance with a seventh embodiment of the present disclosure.

FIG. 11 is a flow diagram of example operations 1100 performed in an electronic device (ED) in accordance with an embodiment of the present disclosure. The operations collectively involve a method for wireless communications occurring in an unlicensed spectrum for a two-step process for accessing a network. In step 1110, the method involves the ED transmitting a first message in a random access channel (RACH) resource. In some embodiments, the first message includes a random access preamble and data. The data may include a UE identifier.

In optional step 1115, prior to receiving a second message from a base station in a second message reception window, the ED transmits a UL transmission. In such an embodiment, the ED sets the contention window size (CWS) for any further UL transmissions, for all channel access priority classes, to a same CWS used in the LBT prior to the first message.

Step 1120 involves the ED successfully receiving the second message from the base station during the specified message reception window. This may be considered an optional step as well, because the ED does not always successfully receive the second message.

In some embodiments, when the subsequent UL transmission is configured to transmit with LBT CAT4 or type 1 uplink channel access procedure, the ED maintains the CWS used for the first message for all channel access priority classes for a subsequent UL transmission.

Step 1130 involves the ED setting a contention window size (CWS) for a listen-before-talk (LBT) category 4 (CAT 4) contention procedure for an uplink (UL) transmission based on receipt of a second message from a base station during a second message reception window that is in response to the first message.

In some embodiments, when the ED successfully receives the second message from the base station during the second message reception window in optional step 1120, the ED sets the CWS for all channel access priority classes for a subsequent UL transmission to a predefined minimum CWS value.

In some embodiments, when the ED does not successfully receive the second message from the base station during the second message reception window in optional step 1120, the ED sets the CWS for all channel access priority classes for a subsequent UL transmission to a larger value than the CWS used in the LBT prior to the first message.

In some embodiments, the UL transmission is a retransmission of the first message, a grant based transmission on a physical uplink shared channel (PUSCH), a configured grant transmission on the PUSCH, or a physical uplink control channel (PUCCH).

Figure 12:
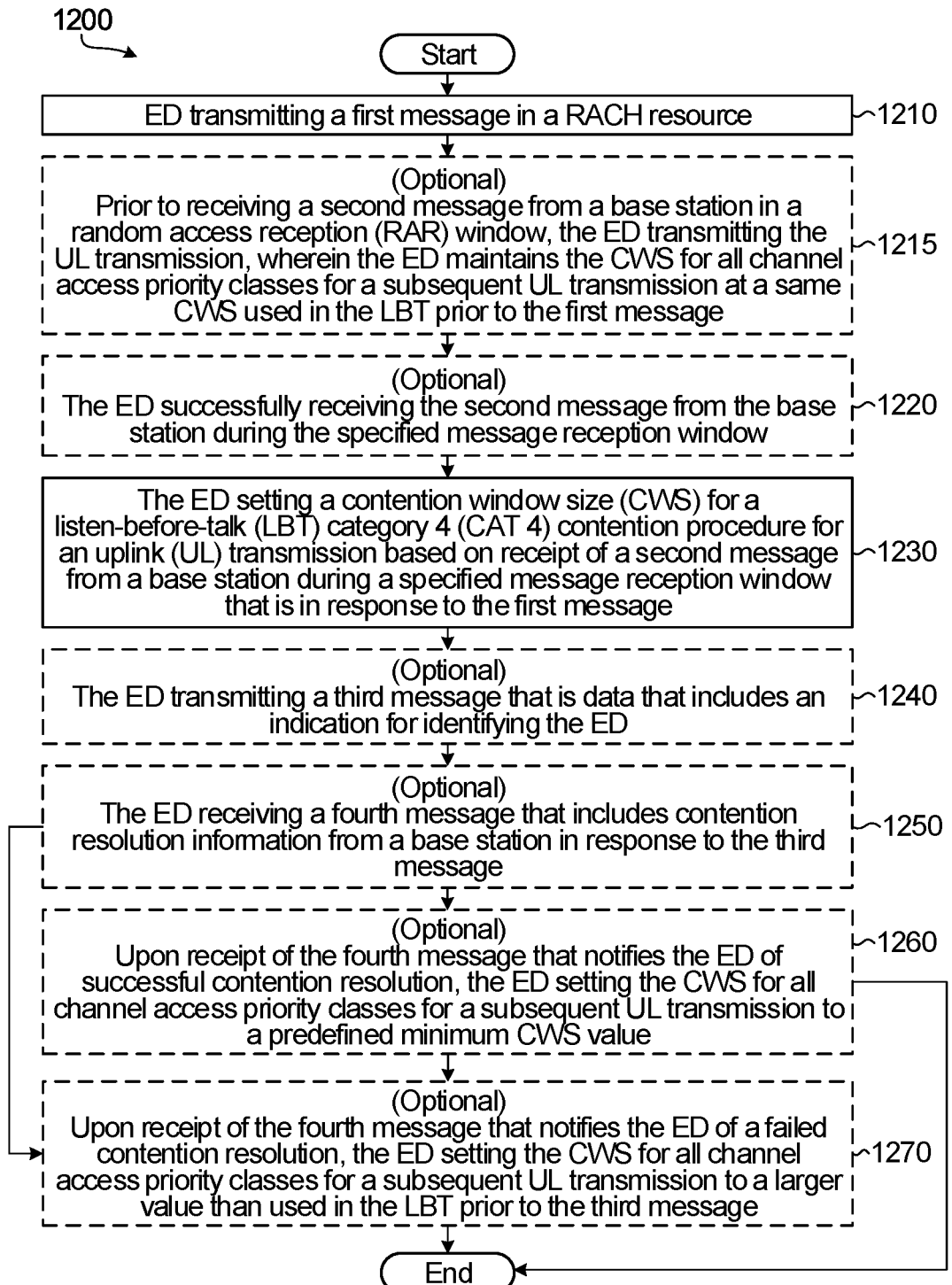
FIG. 12 is a flow diagram of example operations in an ED in accordance with an eighth embodiment of the present disclosure.

FIG. 12 is a flow diagram of example operations 1200 performed in an ED in accordance with an embodiment of the present disclosure. The operations collectively involve a method for wireless communications occurring in an unlicensed spectrum for a four-step process for accessing a network. In step 1210, the method involves the ED transmitting a first message in a RACH resource. In some embodiments, the first message includes a random access preamble.

Steps 1215, 1220 and 1230 are similar to steps 1115, 1120 and 1130 in FIG. 11.

In optional step 1240, the ED transmits a third message. In some embodiments, the third message is data that includes an indication for identifying the ED. In some embodiments, the ED sets a CWS for a LBT CAT 4 contention procedure or type 1 UL channel access procedure for the third message, in response to information received from the base station in the second message.

In some embodiments, the third message is retransmitted using a LBT CAT4 contention procedure or type 1 UL channel access procedure. The ED sets the CWS for all channel access priority classes for the third message retransmission and subsequent UL transmissions to a larger value than used in the LBT prior to the third message.

In some embodiments, the ED utilizes a predefined contention resolution timer to determine if a contention resolution message is received from the base station. If it is determined that the contention resolution timer has expired, the ED sets the CWS for all channel access priority classes for subsequent UL transmissions to a larger value than the CWS used when originally transmitting the third message.

Step 1250 is an optional step that involves the ED receiving a fourth message from the base station. The fourth message includes contention resolution information from the base station in response to the contents of the third message sent by the ED.

In optional step 1260, upon receipt of the fourth message that notifies the ED of successful contention resolution, the ED sets the CWS for all channel access priority classes for a subsequent UL transmission to a predefined minimum CWS value.

In optional step 1270, upon receipt of the fourth message that notifies the ED of a failed contention resolution, the ED sets the CWS for all channel access priority classes for a subsequent UL transmission to a larger value than used in the LBT prior to the third message.

The example operations 1100 and 1200 are illustrative of example embodiments. Various ways to perform the illustrated operations, as well as examples of other operations that may be performed, are described herein. Further variations may be or become apparent.

Figure 13:
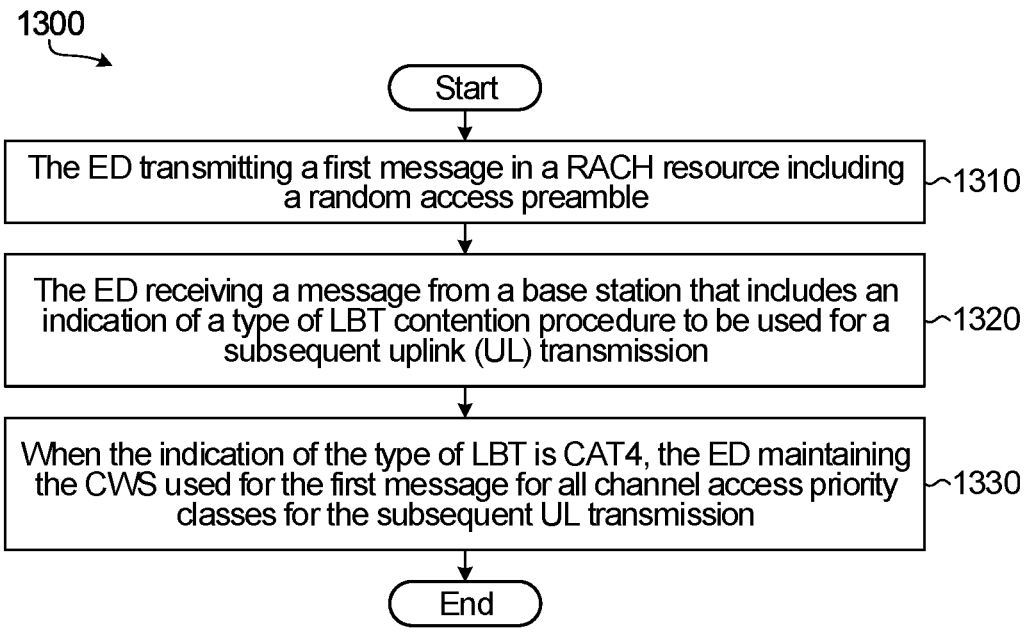
FIG. 13 is a flow diagram of example operations in an ED in accordance with a ninth embodiment of the present disclosure.

FIG. 13 is a flow diagram of example operations 1300 performed in an ED in accordance with an embodiment of the present disclosure. The operations collectively involve a method for wireless communications occurring in an unlicensed spectrum for a four-step process for accessing a network. Step 1310 involves the ED transmitting a first message in a RACH resource. In some embodiments, such as for a four-step random access procedure, the first message includes a random access preamble. In some embodiments, such as for a two-step random access procedure, the first message includes a random access preamble and data.

Step 1320 involves the ED receiving a message from a base station that includes an indication of a type of LBT contention procedure to be used for a subsequent uplink (UL) transmission. In some embodiments, the indication is for the type being CAT4.

Step 1330 involves, when the indication for the type of LBT is CAT4, the ED maintaining the CWS used for the first message for all channel access priority classes for the subsequent UL transmission.

The example operations 1300 are illustrative of an example embodiment. Various ways to perform the illustrated operations, as well as examples of other operations that may be performed, are described herein. Further variations may be or become apparent.

Figure 14:
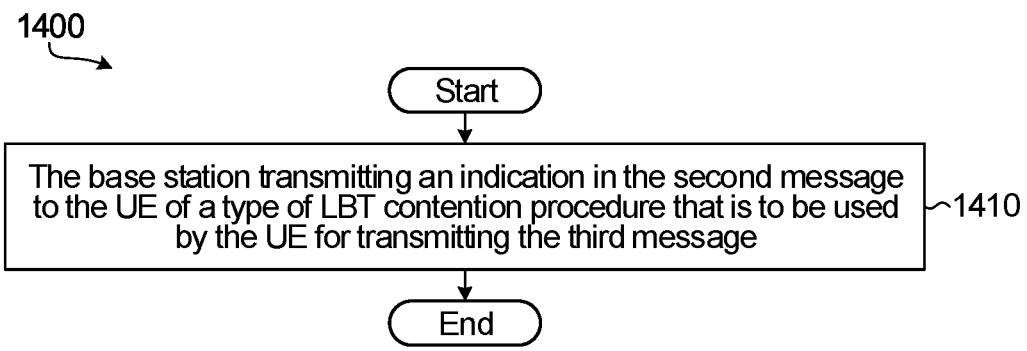
FIG. 14 is a flow diagram of example operations in a base station in accordance with a tenth embodiment of the present disclosure.

FIG. 14 is a flow diagram of example operations 1400 performed in a base station in accordance with an embodiment of the present disclosure. The operations collectively involve a method for wireless communications occurring in an unlicensed spectrum for accessing a network. In a four step procedure for accessing a random access channel (RACH) an ED transmits a first message including a random access preamble. The ED is configured to receive a second message from a base station in response to the first message including an uplink (UL) grant. The ED is configured to transmit a third message on a granted UL resource. The ED is configured to receive a fourth message from the base station in response to the third message. Step 1410 involves the base station transmitting an indication in the second message to the UE of a type of LBT contention procedure that is to be used by the UE for transmission of the third message.

Figure 15:
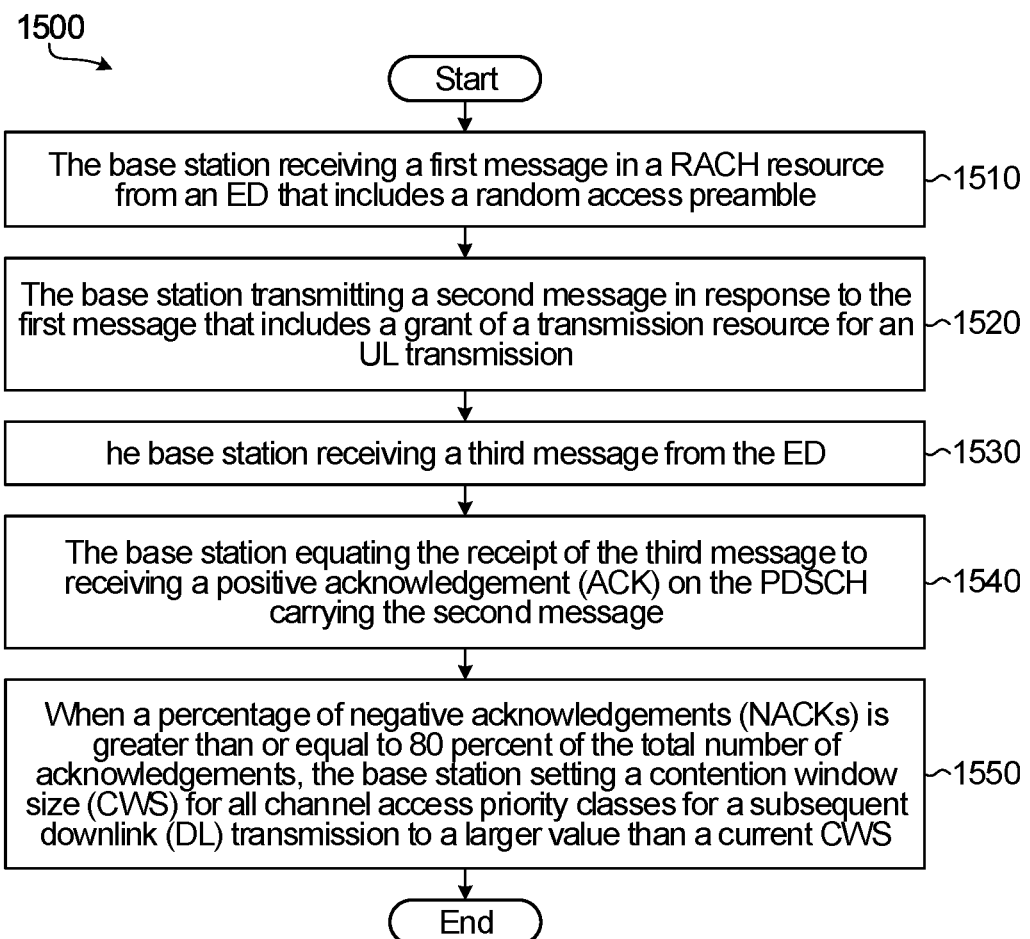
FIG. 15 is a flow diagram of example operations in a base station in accordance with an eleventh embodiment of the present disclosure.

FIG. 15 is a flow diagram of example operations 1500 performed in a base station in accordance with an embodiment of the present disclosure. The operations collectively involve a method for wireless communications occurring in an unlicensed spectrum for accessing a network. Step 1510 involves the base station receiving a first message in a RACH resource from an electronic device (ED) that includes a random access preamble. Step 1520 involves the base station transmitting a second message in response to the first message that includes a grant of a transmission resource for an UL transmission. Step 1530 involves the base station receiving a third message from the ED on the PDSCH. Step 1540 involves the base station equating the receipt of the third message to receiving a positive acknowledgement (AC) on the PDSCH. Step 1550 involves, when a percentage of negative acknowledgements (NACKs) in the reference resource is greater than or equal to a threshold percentage of the total number of acknowledgements, e.g. 80%, the base station setting a contention window size (CWS) for all channel access priority classes for a subsequent downlink (DL) transmission to a larger value than a current CWS.

The example operations 1400 and 1500 are illustrative of example embodiments. Various ways to perform the illustrated operations, as well as examples of other operations that may be performed, are described herein. Further variations may be or become apparent.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding EDs and base stations are known to those of skill in the art. As such, these details are omitted here for clarity.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in the other figures are also intended solely for illustrative purposes.

Other implementation details could also vary between different embodiments. For example, some of the examples above refer to New Radio Unlicensed (NR-U) and LTE terminology. However, the embodiments disclosed herein are not in any way limited to NR-U or LTE systems.

In addition, although described primarily in the context of methods and systems, other implementations are also contemplated, as instructions stored on a non-transitory processor-readable medium, for example. The instructions, when executed by one or more processors, cause the one or more processors to perform a method.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for wireless communications occurring in an unlicensed spectrum for accessing a network, the method comprising:
 transmitting in a random access procedure, by an apparatus, a first message in a random access channel (RACH) resource using a contention window size (CWS), the first message including a random access preamble;
 maintaining in the random access procedure, by the apparatus, the CWS for a listen-before-talk (LBT) category 4 (CAT 4) contention procedure or type 1 UL channel access procedure for an uplink (UL) transmission subsequent to the first message, the UL transmission to be based on receipt of a second message to be received from a base station during a specified message reception time window; and
 transmitting, by the apparatus, the UL transmission using the CWS.

2. The method of claim 1, further comprising:
 receiving, by the apparatus, the second message from the base station in the specified message reception time window that includes a UL grant for the UL transmission and an indication that the apparatus is to use the LBT CAT 4 contention procedure for a subsequent UL transmission;
 in response to information received in the second message, setting, by the apparatus, the CWS for the LBT CAT 4 contention procedure for the subsequent UL transmission of a third message that includes an identification indication for identifying the apparatus; and
 transmitting, by the apparatus, the third message.

3. The method of claim 1,
 wherein the CWS used for the first message is used for all channel access priority classes for a subsequent UL transmission.

4. A method for wireless communications occurring in an unlicensed spectrum for accessing a network comprising:
 transmitting, by an apparatus, a first message in a random access channel (RACH) resource, the first message including a random access preamble and using a category 4 (CAT 4) contention procedure having a contention window size (CWS);
 receiving, by the apparatus, a second message from a base station that includes an indication that a type of listen-before-talk (LBT) contention procedure to be used for a subsequent uplink (UL) transmission is CAT 4;
 maintaining, by the apparatus based on the second message, the CWS for a first UL transmission of the subsequent UL transmission; and
 transmitting, by the apparatus, the first UL transmission using the CWS.

5. The method of claim 4,
 wherein the second message is a random access response (RAR) responding to the first message.

6. The method of claim 5, wherein the RAR includes a UL grant for the first UL transmission.

7. An apparatus comprising:
 one or more processors; and
 a non-transitory computer readable storage medium storing programming for execution by the one or more processors, the programming including instructions to cause the apparatus to:
  transmit in a random access procedure a first message in a random access channel (RACH) resource using a contention window size (CWS), the first message including a random access preamble;
  maintain in the random access procedure the CWS for a listen-before-talk (LBT) category 4 (CAT 4) contention procedure or type 1 UL channel access procedure for an uplink (UL) transmission subsequent to the first message, the UL transmission to be based on receipt of a second message to be received from a base station during a specified message reception time window; and
  transmit the UL transmission using the CWS.

8. The apparatus of claim 7, the programming further including instructions to:
 receive the second message from the base station in the specified message reception time window that includes a UL grant for the UL transmission and an indication that the apparatus is to use the LBT CAT 4 contention procedure for a subsequent UL transmission;

in response to information received in the second message, set the CWS for the LBT CAT 4 contention procedure for the subsequent UL transmission of a third message that includes an identification indication for identifying the apparatus; and transmit the third message.

9. The apparatus of claim 7,
wherein the CWS used for the first message is used for all channel access priority classes for a subsequent UL transmission.

10. An apparatus comprising:
one or more processors; and
a non-transitory computer readable storage medium storing programming for execution by the one or more processors, the programming including instructions to cause the apparatus to:
transmit a first message in a random access channel (RACH) resource, the first message including a random access preamble and using a category 4 (CAT 4) contention procedure having a contention window size (CWS);
receive a second message from a base station that includes an indication that a type of listen-before-talk (LBT) contention procedure to be used for a subsequent uplink (UL) transmission is CAT 4;
maintain, based on the second message, the CWS for a first UL transmission of the subsequent UL transmission; and
transmit the first UL transmission using the CWS.

11. The apparatus of claim 10,
wherein the second message is a random access response (RAR) responding to the first message.

12. The apparatus of claim 11, wherein the RAR includes a UL grant for the first UL transmission.

13. A non-transitory computer-readable storage medium comprising instructions which, when executed by an apparatus, cause the apparatus to perform operations comprising:
transmitting in a random access procedure a first message in a random access channel (RACH) resource using a contention window size (CWS), the first message including a random access preamble;
maintaining in the random access procedure the CWS for a listen-before-talk (LBT) category 4 (CAT 4) contention procedure or type 1 UL channel access procedure for an uplink (UL) transmission subsequent to the first message, the UL transmission to be based on receipt of a second message to be received from a base station during a specified message reception time window, wherein the CWS is a CWS used for the first message; and
transmitting the UL transmission using the CWS.

14. The non-transitory computer-readable storage medium of claim 13, the operations further comprising:
receiving the second message from the base station in the specified message reception time window that includes a UL grant for the UL transmission and an indication that the apparatus is to use the LBT CAT 4 contention procedure for a subsequent UL transmission;
in response to information received in the second message, setting the CWS for the LBT CAT 4 contention procedure for the subsequent UL transmission of a third message that includes an identification indication for identifying the apparatus; and
transmitting the third message.

15. The non-transitory computer-readable storage medium of claim 13, wherein the CWS used for the first message is used for all channel access priority classes for a subsequent UL transmission.

16. A non-transitory computer-readable storage medium comprising instructions which, when executed by an apparatus, cause the apparatus to perform operations comprising:
transmitting a first message in a random access channel (RACH) resource, the first message including a random access preamble and using a category 4 (CAT 4) contention procedure having a contention window size (CWS);
receiving a second message from a base station that includes an indication that a type of listen-before-talk (LBT) contention procedure to be used for a subsequent uplink (UL) transmission is CAT 4;
maintaining the CWS for a first UL transmission of the subsequent UL transmission based on the second message; and
transmit the first UL transmission using the CWS.

17. The non-transitory computer-readable storage medium of claim 16, wherein the second message is a random access response (RAR) responding to the first message.

18. The non-transitory computer-readable storage medium of claim 17, wherein the RAR includes a UL grant for the first UL transmission.

* * * * *